(12) United States Patent
Barnhart

(10) Patent No.: US 6,947,445 B1
(45) Date of Patent: Sep. 20, 2005

(54) AVAILABLE BANDWIDTH CONTROL MECHANISM

(75) Inventor: Andrew Barnhart, Gaithersburg, MD (US)

(73) Assignee: Hughes Electronics Corporation, El Segundo, CA (US)

(*) Notice: Subject to any disclaimer, the term of this patent is extended or adjusted under 35 U.S.C. 154(b) by 1033 days.

(21) Appl. No.: 09/716,924

(22) Filed: Nov. 20, 2000

Related U.S. Application Data

(60) Provisional application No. 60/210,865, filed on Jun. 9, 2000, provisional application No. 60/210,864, filed on Jun. 9, 2000.

(51) Int. Cl.[7] ........................... G08C 15/00; H04J 3/14; G06F 11/00; H04L 12/28; H04L 1/00
(52) U.S. Cl. ................... 370/468; 370/232; 370/412
(58) Field of Search ................. 370/229–238, 370/316–335, 412–468, 501, 342, 479; 709/226–238

(56) References Cited

U.S. PATENT DOCUMENTS

| | | | | |
|---|---|---|---|---|
| 5,898,696 | A | * | 4/1999 | Proctor et al. ............ 370/468 |
| 6,084,858 | A | * | 7/2000 | Matthews et al. ......... 370/238 |
| 6,118,791 | A | * | 9/2000 | Fichou et al. ............. 370/468 |
| 6,229,789 | B1 | * | 5/2001 | Simpson et al. .......... 370/235 |
| 6,233,245 | B1 | * | 5/2001 | Chapman et al. ......... 370/412 |
| 6,249,530 | B1 | * | 6/2001 | Blanco et al. ............. 370/468 |
| 6,408,005 | B1 | * | 6/2002 | Fan et al. .................. 370/412 |
| 6,418,120 | B1 | * | 7/2002 | Yona et al. ................ 370/236 |
| 6,477,143 | B1 | * | 11/2002 | Ginossar .................... 370/230 |
| 6,587,436 | B1 | * | 7/2003 | Vu et al. ................ 370/236.1 |
| 6,628,609 | B2 | * | 9/2003 | Chapman et al. ......... 370/229 |
| 6,657,964 | B1 | * | 12/2003 | Kohzuki et al. ........ 370/236.1 |
| 6,738,350 | B1 | * | 5/2004 | Gao et al. .................. 370/232 |

FOREIGN PATENT DOCUMENTS

| | | |
|---|---|---|
| EP | 0 781 068 A1 | 12/1995 |
| EP | 0 901 301 A2 | 4/1998 |

OTHER PUBLICATIONS

Cui-Qing Yang et al, "A Taxonomy For Congestion Control Algorithms In Packet Switching Networks", IEEE Network, IEEE Inc. New York, US, Vol. 9, No. 4, Jul. 1, 1995, XP000526590, pp. 34–45.

* cited by examiner

*Primary Examiner*—Man U. Phan
(74) *Attorney, Agent, or Firm*—Craig Plastrik

(57) ABSTRACT

An approach for controlling bandwidth allocations for a switching system with transmission constraints is disclosed. A scheduler within a switching system generates bandwidth metrics for a destination site. A traffic control processing logic receives the bandwidth metrics. The traffic control processing logic includes a utilization module that determines utilization associated with the destination site based upon the received bandwidth metrics, and an error calculation module that computes the difference between the determined utilization and a target utilization. A gain and filtering module, which is also a part of the traffic control processing logic, computes a correction value based upon the difference between the determined utilization and the target utilization, in which the correction value being associated with the destination site. Further, the traffic control processing logic includes an adder that outputs a control value based upon a reference control value and the correction value. A bandwidth control processor assigns bandwidth allocation based upon the control value.

36 Claims, 11 Drawing Sheets

AVAILABLE BANDWIDTH CONTROL MECHANISM

CROSS-REFERENCES TO RELATED APPLICATION

This application is related to, and claims the benefit of the earlier filing date of, U.S. Provisional Patent Application (Application No. 60/210,864), filed Jun. 9, 2000, entitled "Available Bandwidth Control Mechanism," the entirety of which is incorporated herein by reference. Additionally, this application is related to U.S. Patent Application (Application No. 60/210,865), filed Jun. 9, 2000, and entitled "Scheduler Utilization Metrics," which are incorporated herein by reference.

BACKGROUND OF THE INVENTION

1. Field of the Invention

The present invention relates generally to communication systems, and is more particularly related to providing congestion avoidance in a switching communication system.

2. Discussion of the Background

As businesses and society, in general, become increasingly reliant on communication networks to conduct a variety of activities, ranging from business transactions to personal entertainment, these communication networks continue to experience greater and greater traffic congestion. For example, the maturity of electronic commerce and acceptance of the Internet as a daily tool pose an enormous challenge to communication engineers to develop techniques to reduce network latency and user response times. With the advances in processing power of desktop computers, the average user has grown accustomed to sophisticated multimedia applications, which place tremendous strain on network resources (e.g., switch capacity). Also, because the decrease in application response times is a direct result of the increased processor performance, the user has grown less tolerant of network delays, demanding comparable improvements in the network infrastructure.

Traffic control can be accomplished using two general approaches: flow control, and congestion control. Flow control seeks to regulate the amount of traffic that is transmitted from a source station to a destination station, by permitting the destination station to control the rate at which the source transfers data as to not overload the respective destination node. Flow control, however, does not directly address the problems associated with managing the traffic load on the network; for instance, numerous source stations can be communicating at rates that are acceptable to the destination stations. Nonetheless, the network (i.e., networking components) may not be able to sustain the overall level of traffic that is exchanged by these source and destination stations. It should be noted that these flow-control protocols, as with Transfer Control Protocol (TCP), tend to cause network congestion—rather than avoid network congestion—by collectively driving the network until it exhibits packet loss along with maximum queuing.

Therefore, congestion avoidance schemes are needed to control the network traffic in a way as to effectively maintain the overall traffic that is introduced by the stations, which are generally connected via intervening nodes. Without a congestion avoidance scheme, a large queuing delay will occur, potentially resulting in dropped packets. Consequently, the quality of service of the system will likely be degraded. Also, because the switch is forced to drop packets, the useful capacity of the system is reduced; thus, the network service provider suffers a loss of revenue.

One traditional approach to congestion avoidance is to upgrade the hardware to increase capacity to enhance the throughput of the system. The main drawbacks with this forklift approach are cost and potential lack of interoperability. Further, in some systems, such as a communication satellite, hardware replacement is impractical. Furthermore, with wireless systems, additional frequency assignments may not be available.

Another technique to avoid congestion involves the development of sophisticated networking protocols. One drawback with this approach is that the developed protocol may not be easily standardized; without industry acceptance, the development cost cannot be recouped. Another drawback is that the protocol is likely to be inefficient, requiring significant overhead bits to effect congestion control; this protocol inefficiency negatively impacts throughput of the network.

Based upon the forgoing, there is a clear need for improved approaches for the management of congestion to improve the traffic transmission efficiencies of networking components, and particularly, those components that are subject to potential traffic congestion.

Accordingly, it is highly desirable for the network to control the traffic that enters the network to avoid congestion and to maximize the effective network throughput without introducing excessive protocol overhead cost.

Congestion avoidance by optimizing switching system performance is highly desirable. In this regard, both the metrics that are used in monitoring the traffic flow as well as the algorithms that are used to process these metrics are of significant interest.

SUMMARY OF THE INVENTION

According to one aspect of the invention, a method is provided for controlling bandwidth allocations. The method includes receiving bandwidth metrics for a destination site from a scheduler, and determining utilization associated with the destination site based upon the received bandwidth metrics. The method also includes computing a difference between the determined utilization and a target utilization, and computing a correction value based upon the difference between the determined utilization and the target utilization. The correction value is associated with the destination. Further, the method encompasses outputting a control value based upon a reference control value and the correction value and allocating bandwidth based upon the control value. Under this approach, congestion avoidance is provided, while increasing effective throughput.

According to another aspect of the invention, a switching system for controlling bandwidth allocations comprises a scheduler that is configured to generate bandwidth metrics for a destination site. A traffic control processing logic is configured to receive the bandwidth metrics. The traffic control processing logic includes a utilization module that is configured to determine utilization associated with the destination site based upon the received bandwidth metrics, an error calculation module that is configured to compute a difference between the determined utilization and a target utilization, a gain and filtering module that is configured to compute a correction value based upon the difference between the determined utilization and the target utilization, in which the correction value is associated with the destination site. The traffic control processing logic also includes an adder that is configured to output a control value based upon a reference control value and the correction value. A bandwidth control processor is configured to perform bandwidth allocation based upon the control value. The above arrangement advantageously enhances system efficiency.

In yet another aspect of the invention, a traffic control processing device for managing available bandwidth based upon bandwidth metrics from a scheduler comprises a utilization module that is configured to determine utilization associated with the destination site based upon the received bandwidth metrics. An error calculation module is configured to compute a difference between the determined utilization and a target utilization. A gain and filtering module is configured to compute a correction value based upon the difference between the determined utilization and the target utilization, in which the correction value is associated with the destination site. An adder is configured to output a control value based upon a reference control value and the correction value. Under the above arrangement, a dynamically adaptive congestion mechanism is provided.

In yet another aspect of the invention, a computer-readable medium carrying one or more sequences of one or more instructions for controlling bandwidth allocations is disclosed. The one or more sequences of one or more instructions include instructions which, when executed by one or more processors, cause the one or more processors to perform the step of receiving bandwidth metrics for a destination site from a scheduler. Another step includes determining utilization associated with the destination site based upon the received bandwidth metrics. Another step includes computing a difference between the determined utilization and a target utilization. Another step includes computing a correction value based upon the difference between the determined utilization and the target utilization, in which the correction value is associated with the destination site. Further steps include outputting a control value based upon a reference control value and the correction value, and allocating bandwidth based upon the control value. This approach advantageously improves efficiency of a switching communication system that has transmission constraints.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

In the following description, for the purposes of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

The present invention accomplishes congestion avoidance by using a scheduler that collects bandwidth metrics and transmits these metrics to a traffic control processing logic. Specifically, a scheduler within a switching system generates bandwidth metrics for a destination region. The traffic control processing logic receives the bandwidth metrics. The traffic control processing logic includes a utilization module that determines utilization associated with the destination site based upon the received bandwidth metrics, and an error calculation module that computes the difference between the determined utilization and a target utilization. A gain and filtering module, which is also a part of the traffic control processing logic, computes a correction value based upon the difference between the determined utilization and the target utilization, in which the correction value is associated with the destination site. Further, the traffic control processing logic includes an adder that outputs a control value based upon a reference control value and the correction value. A bandwidth control processor assigns bandwidth allocation based upon the control value. The above available bandwidth control mechanism optimizes bandwidth allocations to various destination sites (e.g., microcells in a satellite communication system).

Figure 1:
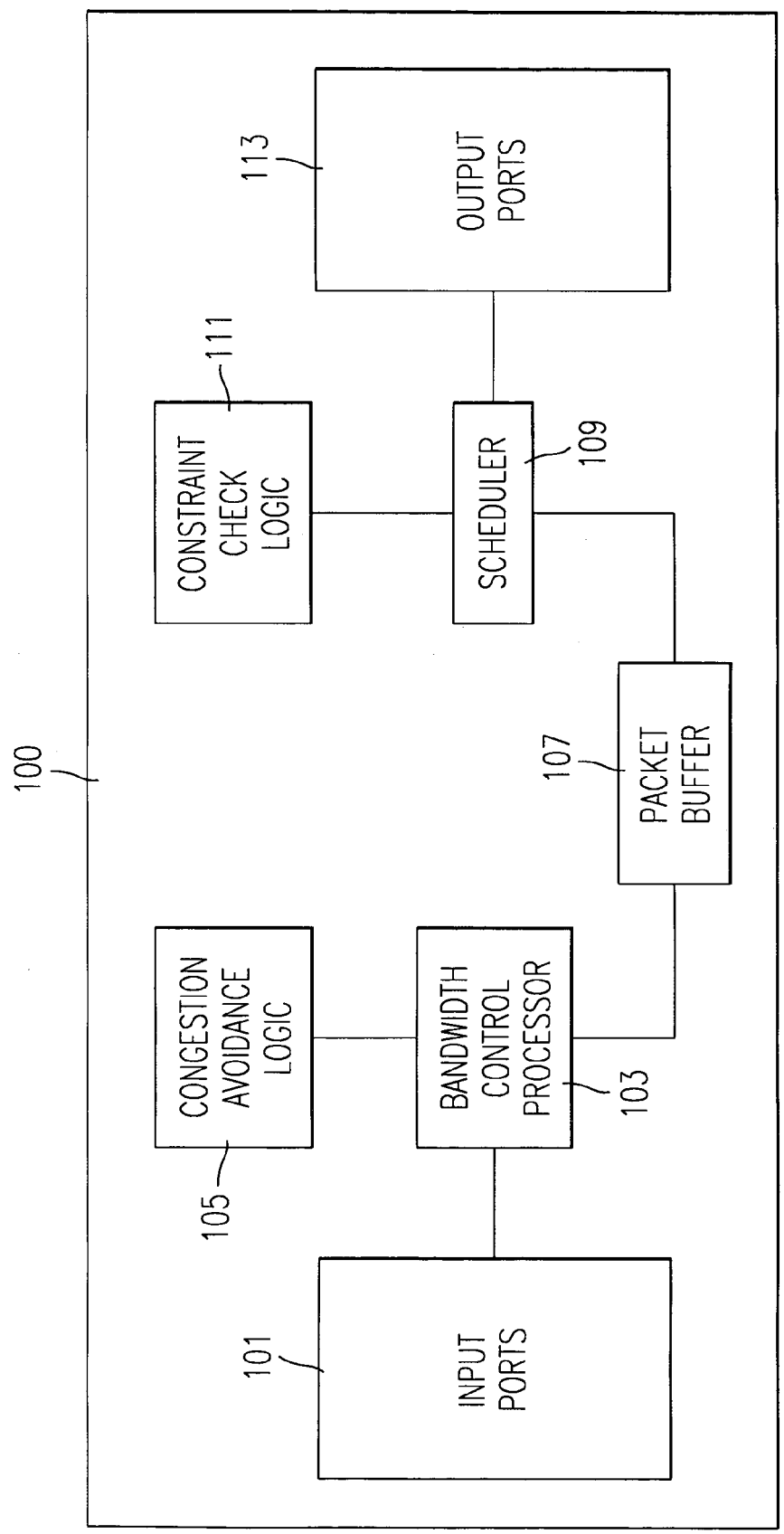
FIG. 1 is a block diagram of a switch with congestion avoidance capability, in accordance with an embodiment of the present invention.

FIG. 1 shows a functional block diagram of a switch with congestion avoidance capability, according to an embodiment of the present invention. Switch 100 includes multiple input ports 101 that receive incoming traffic from one or more source nodes (not shown) and forwards the traffic to a bandwidth control processor 103. A congestion avoidance logic 105 within switch 100 operates in conjunction with the bandwidth control processor 103 to control the amount of traffic entering input ports 101. A packet buffer 107 stores packets from input ports 101 that have been accepted for transmission by the bandwidth control processor 103. The stored packets in packet buffer 107 are transmitted to a scheduler 109, which communicates with a constraint check logic 111 to determine whether the stored packets conform with established transmission constraints. Scheduler 109 examines the destination addresses of the packets that are stored in packet buffer 107 using a round-robin scheme and forwards such packets to an appropriate output port among the various output ports 113. The congestion avoidance functionality of switch 100 is described below with respect to FIG. 2.

Figure 2:
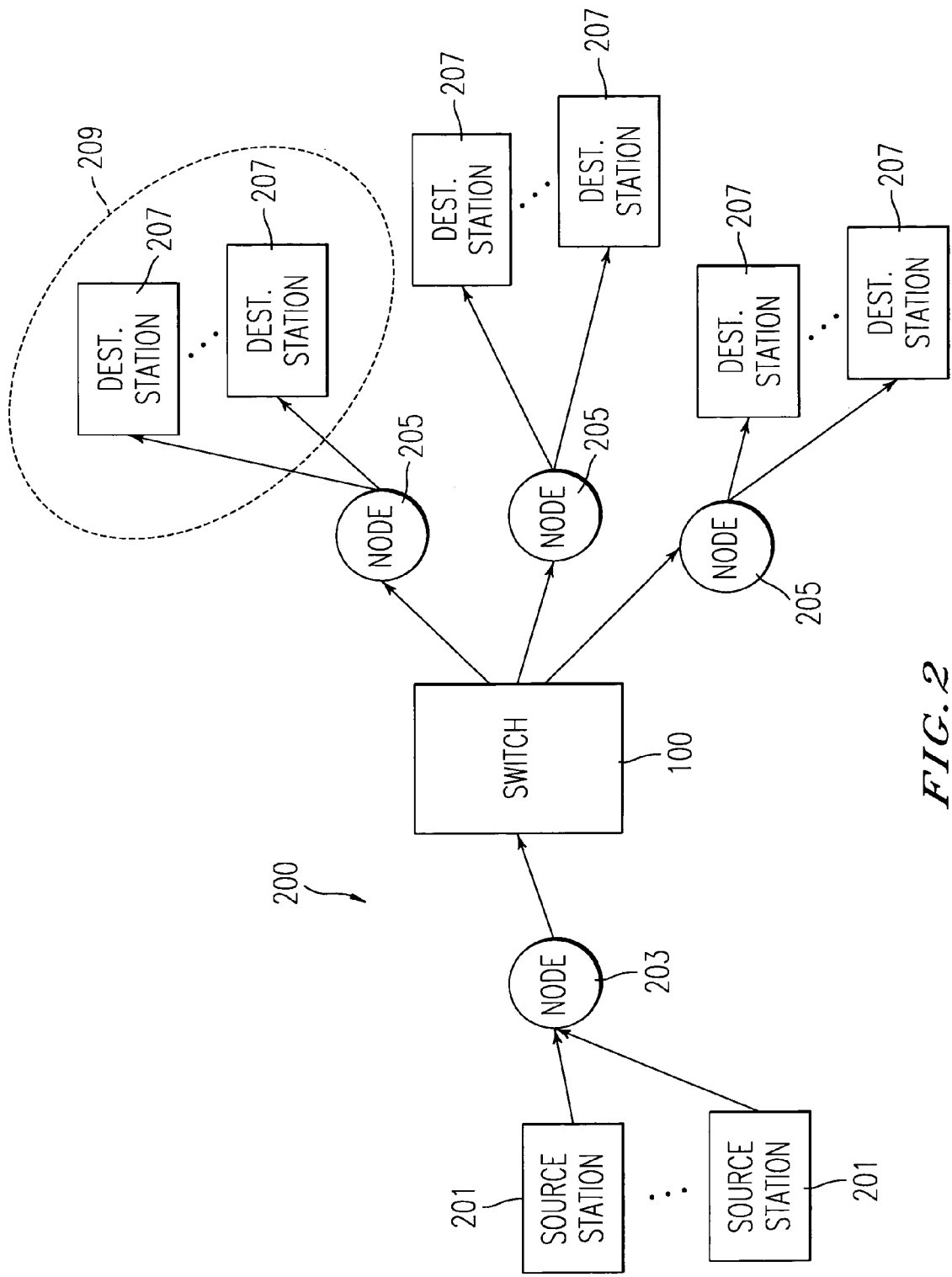
FIG. 2 is a diagram of a communication network that utilizes the switch of FIG. 1.

FIG. 2 shows a communication network that utilizes a switch with congestion avoidance functionality, in accordance with an embodiment of the present invention. A communication network 200 includes multiple source stations 201 that generate traffic to node 203, which can be any networking equipment that transfers data. In an exemplary embodiment, node 203 is an internetworking device, such as a router; alternatively, node 203 may be any type of gateway in a land-based or satellite-based communication system. Node 203 is connected to an input port (FIG. 1) of switch 100. Although not shown, additional nodes, such as node 203, may be connected to additional ports 101 of switch 100. The output ports (FIG. 1) of switch 100 connects to multiple nodes 205, which can be the same networking component as that of node 203. As shown, each of the nodes 205 can potentially communicate with numerous destination stations 207 within region 209 (e.g., sub-network). For example, if nodes 205 are routers, the routers would have multiple output ports designated for region 209.

As indicated previously, the conventional communication network exhibits performance characteristics that are dictated largely by the hardware limitations of switch 100. In other words, the throughput of the network 200 depend on such parameters as buffer size and processing capability of switch 100. In some practical systems, however, the communication network 200 possess network bottlenecks at points in the network other than the switch 100. For example, assuming that for security reasons, destination stations 207 within region 209 cannot simultaneously receive packets, consequently switch 100 may need to buffer some of the packets until the first set of packets are delivered to the particular destination stations 207. Thereafter, the buffered packets within switch 100 can be delivered to the destination stations 207 within region 209. From this example, it is clear that the buffering of the packets within switch 100 can result in system performance that does not depend on the hardware capabilities of switch 100, but instead on the network constraints associated with region 209.

The above scenario is characteristic of a satellite communication system. For the purposes of explanation, the operation of congestion avoidance according to an embodiment of the present invention, is discussed with respect to a satellite communication system with transmission constraints to downlink cells. However, it should be noted that the approach has applicability to many other switching systems, as recognized by one of ordinary skill in the art. For example, the switching systems may include an ATM (Asynchronous Transfer Mode)/SONET (Synchronous Optical Network) network, a Gigabit Ethernet network, and a voice network. The end stations of these systems are referred to as destination sites. Accordingly, the destination sites in a satellite system would be downlink cells.

Figure 3A:
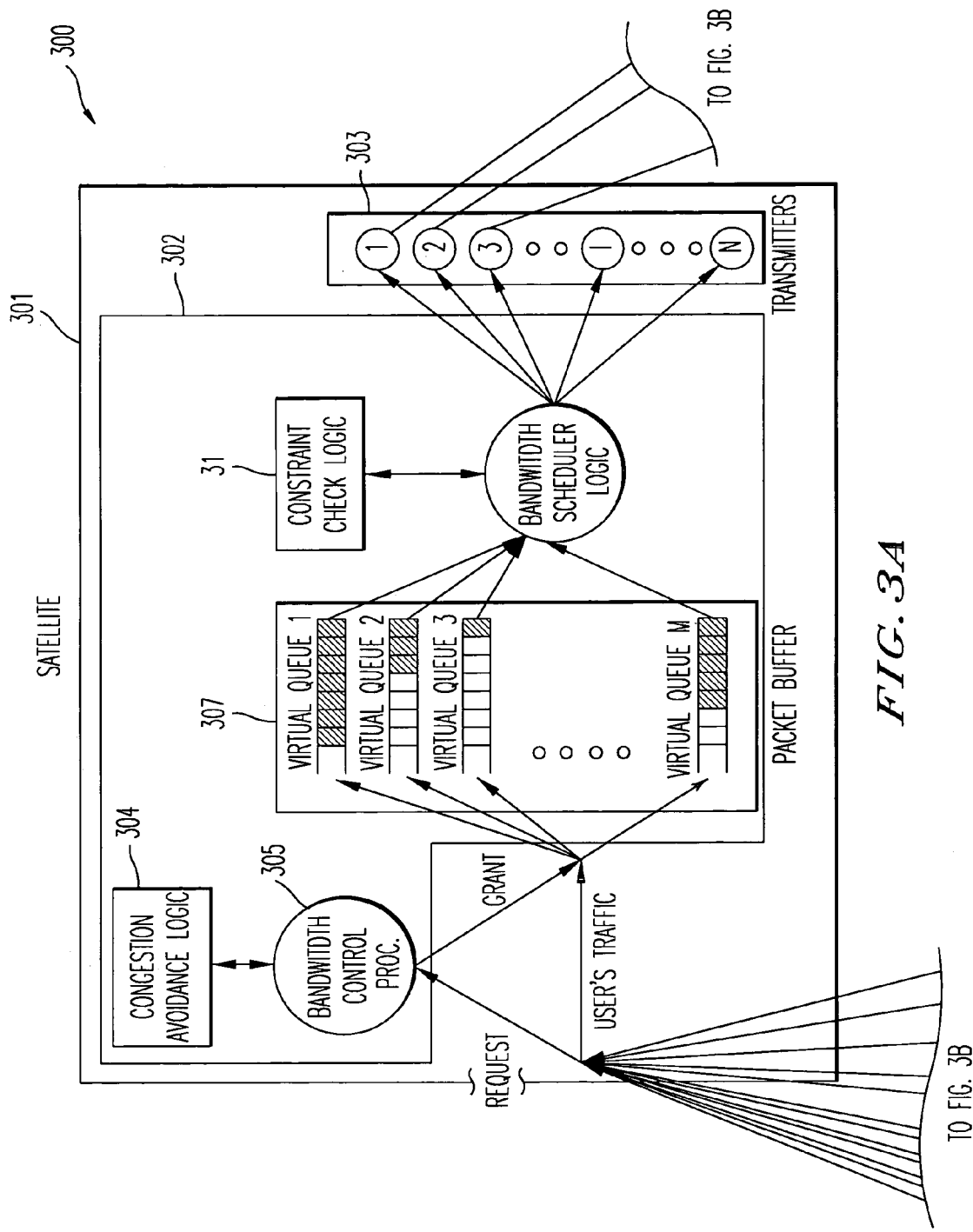
FIGS. 3A and 3B are diagrams of a satellite communication system with congestion avoidance capability, according to an embodiment of the present invention.
Figure 3B:
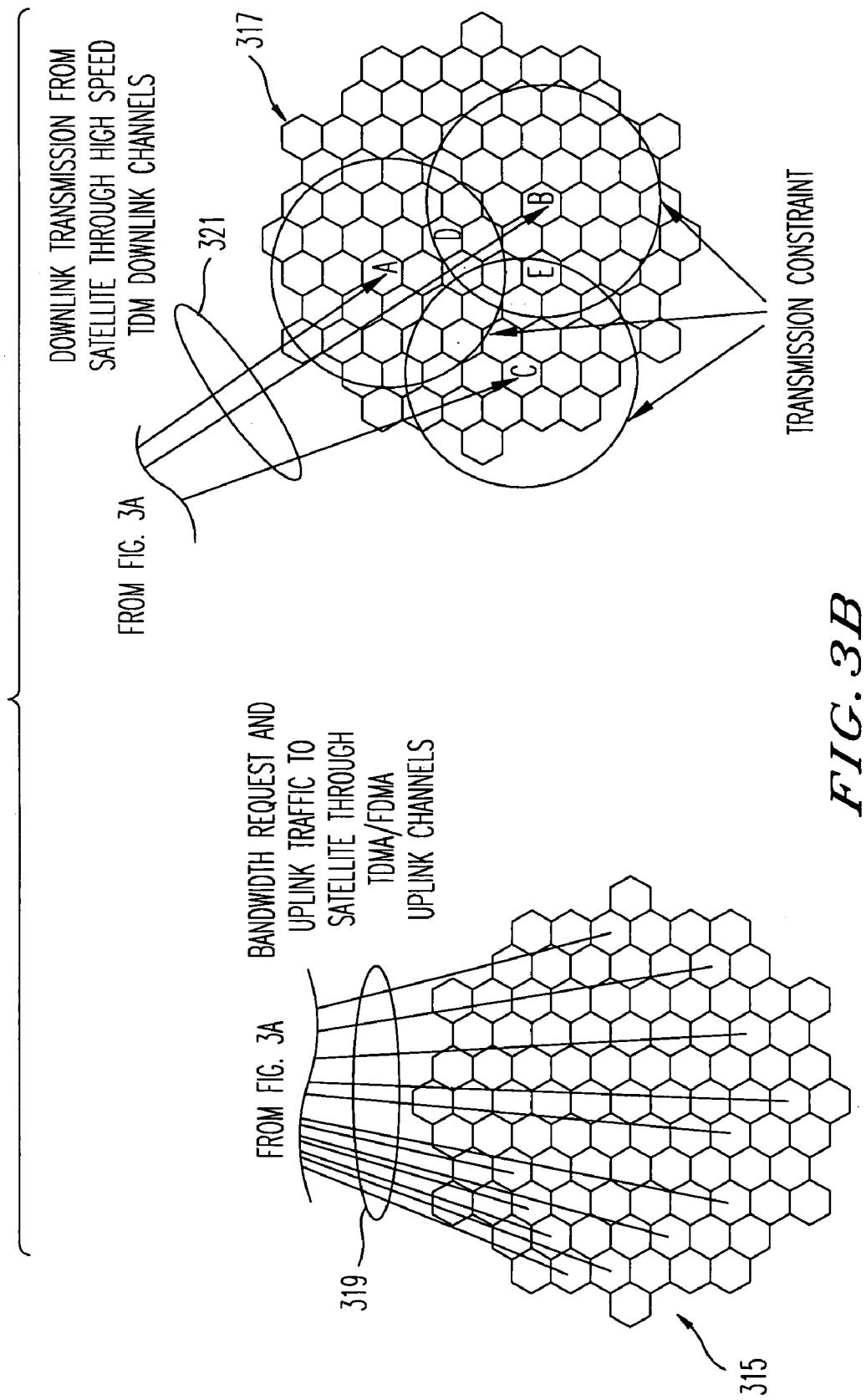
Figure 6:
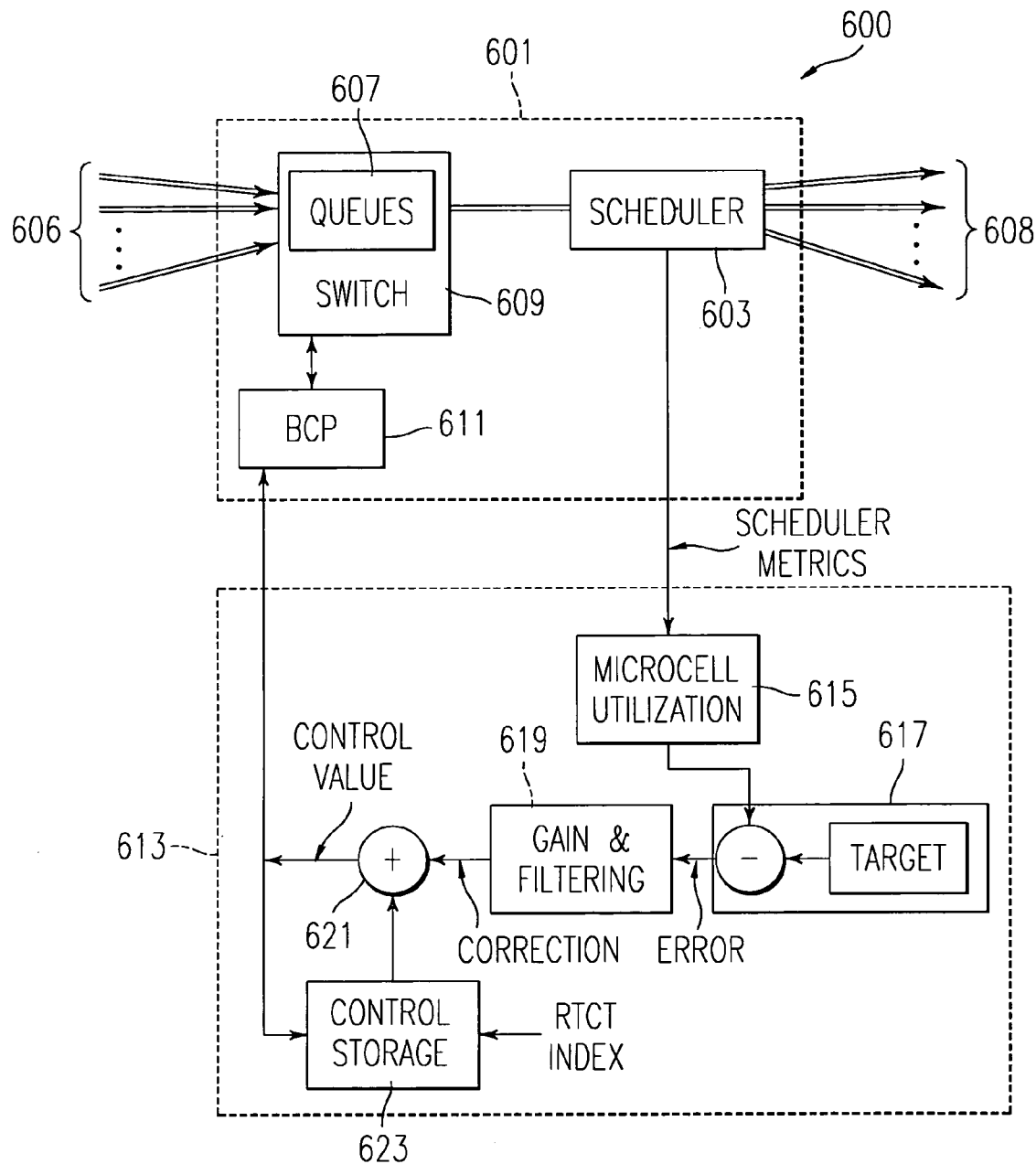
FIG. 6 is a diagram of an available bandwidth control mechanism (ABCM) utilized in the system of FIG. 5.

FIGS. 3A and 3B show a satellite communication system with an on-board switch, in accordance with an embodiment of the present invention. The satellite payload 301 has a switch 302 that is connected to multiple transmitters 303; that is, N transmitters. Switch 302 includes a congestion avoidance logic 304, a bandwidth control processor (BCP) 305, a packet buffer 307, a downlink scheduler 309, and a constraint check logic 311. One of ordinary skill in the art would recognize that the congestion avoidance logic 304, bandwidth control processor (BCP) 305, downlink scheduler 309, and constraint check logic 311 may be implemented via software, hardware (e.g., general processor, an Application Specific Integrated Circuit (ASIC), etc.), firmware or a combination thereof. As shown, the BCP 305 is a part of switch 302. Alternatively, the BCP 305 may be implemented as a separate processor that is separate from switch 302 (as shown in FIG. 6).

In switching communication system 300, satellite terminals (ST) (not shown) originate traffic from a coverage area 315. The generated traffic from the STs is transferred through switch 302 and terminate at destination STs (not shown) within coverage area 317. It should be noted that the destination STs can be within the same coverage area 315 as the originating STs. To effectively transmit traffic to the desired destination ST through switch 302, source STs transmit bandwidth requests to the bandwidth control processor 305 prior to transmitting any data traffic.

A connection that is established between a source ST and a destination ST is controlled by the BCP 305 and a network operation center (NOC). The NOC (shown in FIG. 5), which is based on the ground, provides management functions for the system 300. An ST needs to obtain authorization from the NOC before making a request to the BCP 305. However, once an ST has received authorization from the NOC, the ST is likely to receive a rate allocation from the BCP 305 because the NOC keeps track of the total uplink (and downlink) bandwidth available for connections and will block a connection request if there is insufficient satellite capacity available to satisfy the request.

A major advantage of a congestion avoidance mechanism of system 300 is that if a connection request is blocked because of impending congestion in the switch 302, the connection may be given an alternate path for connection, should one exist, rather than admitting the connection to the switch 302 and potentially deteriorating the grade of service for both the connection and previously admitted connections. Consequently, the congestion avoidance mechanism of system 300 allows commitment to a quality of service for those connections that are admitted. A key source of congestion in the system 300 lies with the downlink channels 321. Accordingly, the bandwidth control processor (BCP) 305 implements the bandwidth control function which includes controlling the allocation of uplink channels and timeslots and mitigating downlink congestion. Bandwidth control processor, 305 examines the requested bandwidth and replies with grants based on downlink resource availability, as determined by congestion avoidance logic 304 and uplink resource availability. As will be explained in greater detail later, congestion avoidance in the system 300 is achieved by the collaboration of bandwidth control processor 305, congestion avoidance logic 304, a scheduler 309, and a traffic control processing logic (613 of FIG. 6) to regulate the amount of traffic received by the switch 302 through TDMA (Time Division Multiple Access)/FDMA (Frequency Division Multiple Access) uplink channels 319 via request/grant bandwidth control processes. The present invention concentrates on the interaction between the scheduler 309 and the traffic control processing logic, which are more fully described in FIGS. 5–7.

The service areas 315 and 317 are covered by a set of polygons that are fixed on the surface of the earth. Downlink polygons, called microcells, are hexagonal in shape as viewed from the spacecraft, with seven microcells clustered together to form an uplink polygon, called a cell. As used herein, the term microcell is used synonymously with the term downlink cell. The satellite generates a set of uplink circular beams that each encloses a cell. It also generates a set of downlink beams that each encloses a microcell.

Up to 12 downlink spot beams can be transmitted simultaneously on each of two polarizations subject to minimum microcell separation distance limitations. Beams on the same polarization must be sufficiently separated spatially to avoid unacceptable co-channel interference. Another co-polarized beam is not allowed to transmit to another microcell within an ellipse or else excessive interference may occur. The "keep-out" areas apply separately and independently for the two polarizations; the link budgets account for any cross-polarization interference that may occur.

As shown in FIGS. 3A and 3B, on the downlink of communication system 300, at each TDMA transmission slot, the downlink scheduler 309 selects up to n bursts of packets from M virtual queues of the packet buffer 307 to transmit through n transmitters, based on the scheduling algorithm and transmission constraint checks. The scheduling algorithm, in an exemplary embodiment, is a round-robin scheme. Sometimes the downlink scheduler 309 may not be able to find n bursts to transmit due to transmission constraints, in which case aggregate downlink transmission capacity will be limited by the transmission constraints. The downlink congestion in communication system 300 occurs when the amount of traffic admitted to the switch 302 exceeds the capacity of the downlink. In other words, if the BCP 305 made uplink allocations simply based on the availability of uplink slots, the BCP 305 would sometimes admit more traffic to a particular downlink cell (i.e., destination site) or cluster of mutually-interfering microcells than the downlink can carry. Consequently, the data packets for these areas would completely fill the packet buffer 307 in the payload's switch 302, resulting in dropped packets. Therefore, the availability of both uplink slots and downlink bandwidth factor into bandwidth allocations that is performed by the BCP 305.

The main transmission constraint in communication system 300 is the interference constraint; that is, two simultaneous downlink transmissions cannot be performed if they are directed at downlink cells which are within a system limit interference distance. In FIG. 3B, because downlink cells A, B and C in coverage area 317 are outside the system limit interference distances (as shown by the overlapping circles) from one another, the satellite can simultaneously transmit packets to these downlink cells A, B and C. However, simultaneous transmission cannot be directed to downlink cells D and A, downlink cell D and B, downlink cell E and B and downlink cell E and C since they are within the system limit interference distance. That is, these downlink cells are in the same circle.

To illustrate the downlink capacity limitation of the system 300 stemming from transmission constraints (in particular, interference constraints), a scenario in which there are packets in the virtual queues of packet buffer 307 that are destined only to downlink cells A, B, C, D and E is considered. It should be noted that without any constraint, there can be five transmissions at one TDMA slot; however, with the interference constraint, only a maximum of three transmissions at one TDMA slot is possible (to downlink cells A, B, and C). If the satellite is to transmit to downlink cell D or downlink cell E, there can be at most two transmissions only, either to downlink cells D and C or to downlink cells E and A.

Figure 4:
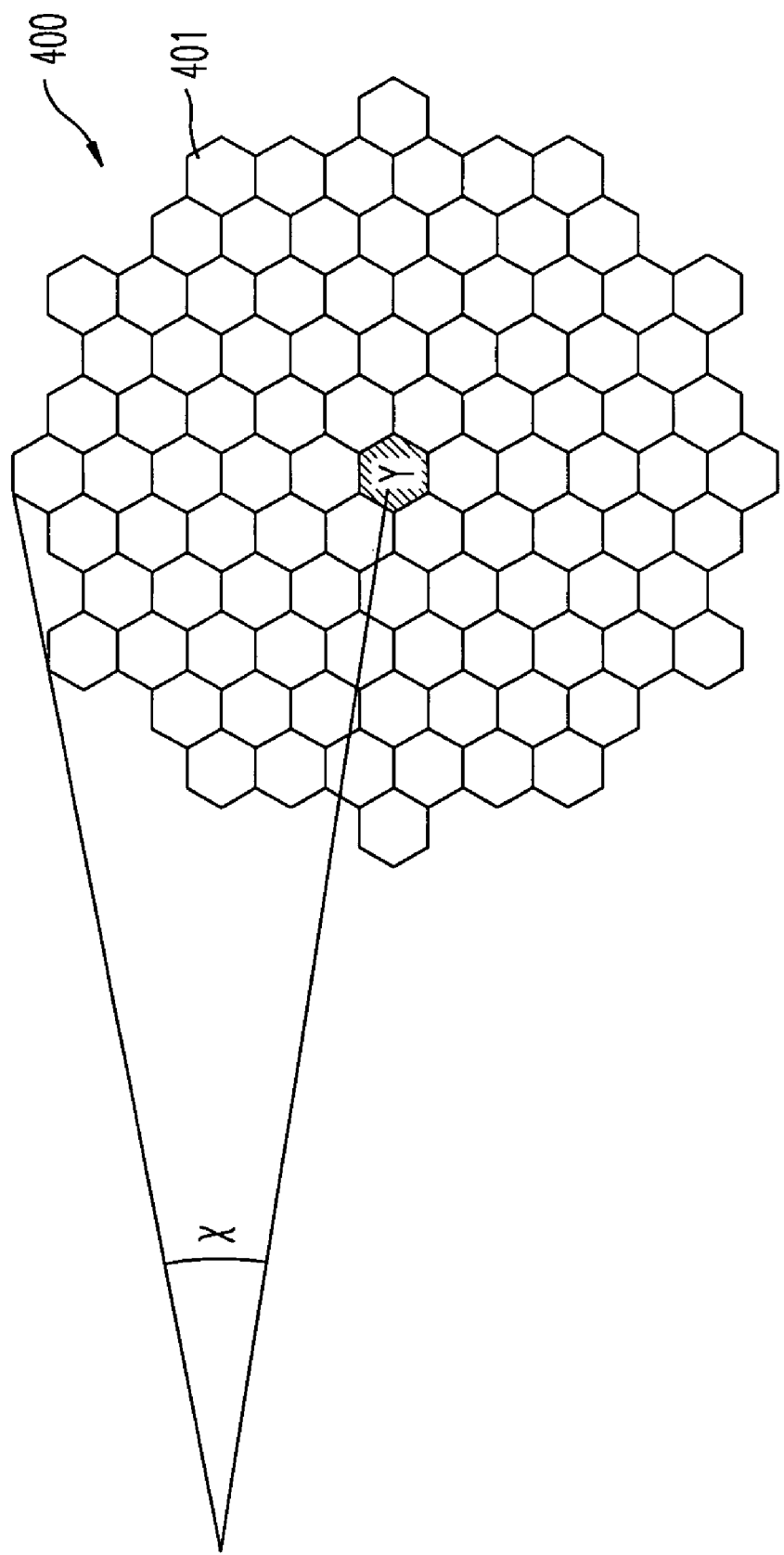
FIG. 4 is a diagram of an interference region of a target downlink cell, in accordance with an embodiment of the present invention.

FIG. 4 shows a diagram of an interference region of a target downlink cell defined according to an embodiment of the present invention. An interference region 400 includes a target downlink cell, which is surrounded by numerous downlink cells 401. Downlink cells 401 are clustered around target downlink cell Y within a radius that is determined by an angle x from the point of view of a satellite. The angle x can be set to any degree, depending on the coverage area and network application.

As will be discussed in more detail below, the BCP 305 and the congestion avoidance logic 304 limits the aggregate traffic going to a sets of downlink cells, referred to as an "interference cluster", instead of limiting the traffic going to each individual downlink cells. An interference cluster is a maximal set of downlink cells that are within the system limit interference distance from one another. Since clusters are not mutually exclusive of one another, a downlink cell can belong to more than one cluster.

According to one embodiment of the present invention, two types of requests for bandwidth allocation are defined: rate requests, and volume requests. In general, rate requests are utilized for connection-oriented traffic, while volume requests are used to transmit bursty traffic. In particular, rate requests specify the number of slots in each uplink frame that an ST needs to meet the uplink demands for a relatively constant traffic (e.g., connection-oriented). A rate request results in the allocation of a constant number of slots each frame, spread out as evenly in time as possible, which the ST can use to send packets at a constant rate. The requesting ST gets a constant allocation of that uplink capacity every frame until the request is cancelled by the ST via a de-allocation message to the satellite.

Volume requests specify the number of uplink slots that an ST requires to send a specific number of packets to another ST. The requesting ST receives a periodic allocation of zero, one or many slots within a specific frame until the entire number of slots requested has been allocated. Volume requests are used by the ST to send a burst (one or many) of data packets on the uplink. Several volume requests may be transmitted by the ST in a short period of time to send a file that has hundreds of data packets (e.g., segmented IP (Internet Protocol) packets) to another ST.

Figure 5:
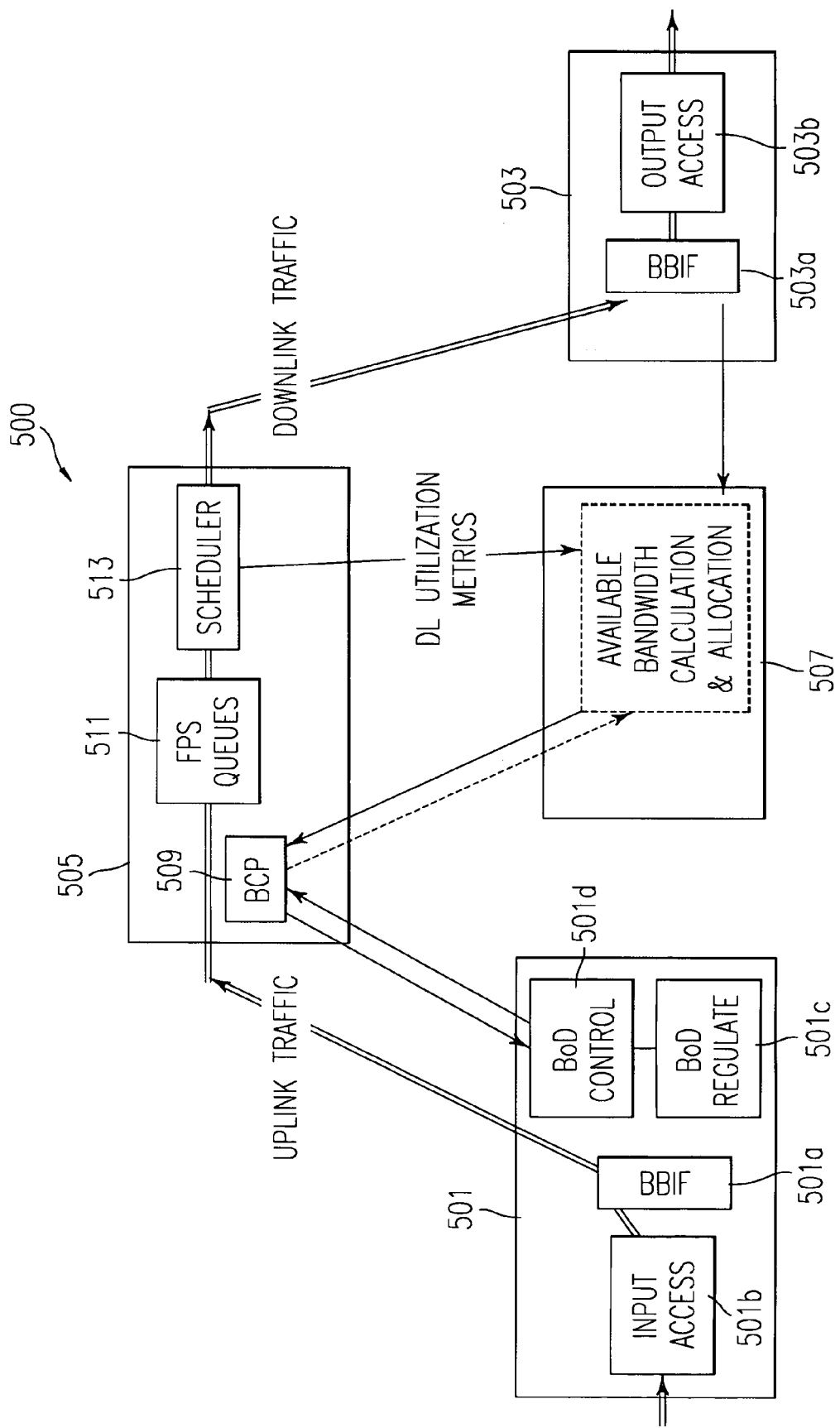
FIG. 5 is a diagram showing the interaction among the satellite terminals (STs), the satellite, and the Network Operations Center (NOC) in a satellite communication system, in accordance with an embodiment of the present invention.

FIG. 5 shows the interaction among the satellite terminals (STs), the satellite, and the Network Operations Center (NOC) in a satellite communication system, in accordance with an embodiment of the present invention. As shown, a satellite communication system 500 includes STs 501, 503, a satellite 505, and a NOC 507. For explanatory purposes, only the transmit section of a source ST and the receive section of a destination ST are shown. Accordingly, the ST 501 is a transmitting ST, while ST 503 is designated as a receiving ST. Each of the STs 501 and 503 has an interface 501b, 503b, respectively, for interfacing with an external network (not shown) and the satellite to control the traffic flow. Specifically, traffic from the external network (not shown) enters an input access 501b of the transmitting ST 501 and is transmitted to an uplink to the satellite 505. The satellite 505 forwards the traffic to the receiving ST 503 via the downlink. The traffic egresses an output access 503b of the receiving ST 503 to another network (not shown).

User traffic is received by the input access 501b of the transmitting ST 501, where it is stored and processed (e.g., segmentation of IP (Internet Protocol) frames). As previously discussed, for volume traffic the transmitting ST 501 makes bandwidth-on-demand (BoD) requests to a bandwidth control processor (BCP) 509. In turn, the BCP 509 selectively issues BoD grants that specify an uplink assignment, if it is determined that both uplink and downlink bandwidths are available. For rate traffic, the transmitting ST 501 makes traffic requests to the NOC 507, for which the NOC 507 authorizes according to the uplink and downlink bandwidths that are available. If so authorized, the transmitting ST 501 makes a rate BoD request to the BCP 509 to obtain a specific uplink assignment.

If transmitting ST 501 possesses a dedicated uplink assignment (i.e., rate request) such that the ST 501 does not employ BoD requests to the BCP 509 to send traffic, the ST 501 is considered a high-volume uplink (HVUL) ST. That is, an active HVUL ST 501 already has uplink bandwidth assigned by the NOC 507. For any significant change in traffic demand in HVUL traffic (to a specific destination), the ST 501 makes traffic rate adjustment request to the NOC 507, for which the NOC 507 provides authorization according to the downlink bandwidth that is available.

Traffic sent the uplink might be dropped in the satellite 505, if the switch queue 511 is experiencing congestion for a particular microcell. This operation is based upon both queue utilization and the priority level of the specific traffic involved. If the traffic is not dropped, the traffic will be queued in the switch queue 511 for transmission via a downlink to the microcell that contains the destination ST.

In the system 500 of FIG. 5, every 21.7 $\mu$sec, a downlink scheduler 513 assigns up to 24 bursts of traffic (e.g., each burst may be 12 packets) to the downlink spot beams. As previously discussed, a significant potential source of congestion is that the scheduler 513 needs to make these assignments to geographically disperse locations in order to avoid interference between neighboring microcells (i.e., transmission constrained, in part, because of interference considerations). If downlink congestion occurs, the queues 511 rapidly fill up and overflow, resulting in dropped packets.

The STs 501 and 503 support numerous application protocols, as represented by the input access 501b and output access 503b, in addition to utilizing set of networking protocols that are required to communicate with the external network (not shown). However, for switching efficiency, as with Asynchronous Transfer Mode technology, the network 500 employs a common packet size from the backbone interface (BBIF) 501a through the satellite 505 to the BBIF 503a. As a result, segmentation and reassembly (SAR) of the various protocol data units cannot be avoided. Effective throughput depends on the success of this SAR process, giving rise to the concept of "good" throughput ("goodput") and "bad" throughput ("badput").

The effective throughput is the amount of traffic that exits the network and is useful to the end application. Goodput is a metric for evaluating this effective throughput. The minimum criteria for goodput is the number of successfully reassembled packets; goodput may also include end application effects as appropriate, such as TCP (Transmission Control Protocol) windows. For example, assuming that an IP packet is segmented into 15 segments at the transmitting ST 501, if all 15 segments are successfully recombined at the receiving ST 503, then all 15 segments contribute to goodput. However, if one segment is lost (e.g., during for overflow of queues 511), then without a reliable link protocol (RLP), there is zero goodput for the IP packet.

Badput is that portion of the downlink traffic that is not useful to the end application, in particular that which does not get successfully recombined at the receiving ST 503. Continuing with the above example, if one segment is lost, then, without RLP, there are 14 segments of badput for the IP packet. With standard TCP/IP, the whole TCP window would constitute badput when a single segment is lost. The units for goodput and badput are the same as that used for throughput; further, these parameters may also be expressed as a percentage of the total throughput.

The switch (not shown) within the satellite 505 supports a packet drop priority scheme, in which the BCP 509 implements drop thresholds, which limit the number of packets entering the queues 511. In an exemplary embodiment, four drop priorities are implemented to determine the order in which packets will be dropped during congestion. Priority 0 is assigned to the highest priority traffic and would be the last type of packets to be dropped. Priority 3 is assigned to the lowest priority traffic and would be the first type of packets to be dropped. Before uplink transmission, the transmitting ST 501 marks packets as one of these four drop priorities.

The queues 511, which in an exemplary embodiment are logical, correspond to the microcells; the queues 511 store traffic on a burst basis (e.g., in groups of 12 packets). In an exemplary embodiment, for each one of the queues 511, a pair of thresholds (i.e., a drop maximum ("drop max") and a drop minimum ("drop min")), which correspond to each of the four priorities, restrict the number of packets that are stored in the queues 511. When the number of bursts in a queue 511 exceeds the drop max threshold for a given priority, the packets in the priority are dropped as they are demodulated from the uplink. Packets continue to be dropped until the traffic falls below the drop min threshold. If congestion persists, packets are dropped based upon the associated thresholds of the other priorities. Utilizing both a drop max and a drop min provides for a hysterisis in queue occupancy that "bunches" packet dropping. This capability is useful in reducing the generation of badput. Badput is also minimized by accounting for the utilization and available bandwidth of the microcells via the scheduler 513, in accordance with the present invention.

The scheduler 513 generates messages that contain utilization metrics to the NOC 507. According to one embodiment of the present invention, for each microcell, the scheduler 513 employs two counters (not shown) to gather bandwidth metrics associated with the utilization and available bandwidth of the microcell. These counters are denoted as follows: a "Yes" counter that tracks the number of times that an assignment was made for a specific microcell, and a "No" counter that tracks the number times a queue 511 was examined for assignment, but had no traffic to send. The counter values of both counters are sent to the NOC 507 after every measurement period; e.g., every super frame (786 msec).

The computation of the traffic statistics can be performed within the satellite 500, in which case the message that is sent to the NOC 507 would include these computed traffic statistics. Alternatively, a processor 508 within NOC 507 can compute the traffic statistics from the counter values that are received from the scheduler 513, as follows:

| | |
|---|---:|
| Carried Load=Yes | Eq.(1) |
| Remaining Available Bandwidth=No | Eq.(2) |
| Total Available Bandwidth=Yes+No | Eq.(3) |
| Percent Utilization=Yes/(Yes+No) | Eq.(4). |

In Eq. (1), the Carried Load is equated with the Yes counter value. The Remaining Available Bandwidth, as seen in Eq. (2), equals the No counter value. The Total Available Bandwidth (Eq. (3)) is determined based upon the sum of the Yes and No counter values. The Percent Utilization, as seen in Eq. (4), is equal to the Yes counter value divided by the sum of the Yes and No counter values. It is observed that the utilization of Eq. 4 is responsive to both changing carried traffic, as given by the Yes counter value and the changing available bandwidth, as given by the Yes and No counter values. The NOC 507 processes the above bandwidth metrics and determines the bandwidth that is available to each microcell. Then, according to service demands and policy rules, it apportions this bandwidth to the traffic classes: rate, HVUL, and volume.

For volume traffic, the NOC 507 determines a threshold for each microcell that the BCP 509 should not exceed in granting BoD requests for that destination during a bandwidth allocation period (96 msec.). These thresholds are set to minimize packet dropping, while not under utilizing available bandwidth. For each bandwidth allocation period, a BoD request for a microcell may be reduced or denied if making the grant with the others already granted would cause the traffic to exceed the threshold specified for the cell. It is noted that at the start of the bandwidth allocation period, pre-existing rate grants are immediately subtracted from the thresholds, with only the remainder being available for volume traffic.

An additional consideration arises from the fact that the BCP 509 has finite processing power. During periods of high traffic demand, the number of BoD requests to the BCP 509 may be significantly beyond the capacity of the BCP 509 to process them. Accordingly, a mechanism is provided for the transmitting ST 501 to throttle back the volume BoD requests to the BCP 509. The BCP 509 determines its utilization, which is periodically sent in control messages to the NOC 507, alerting the NOC 507 about the level of BCP congestion.

As a result, NOC 507 sends these control messages to the transmitting ST 501 to reduce ST BoD requests during periods of BCP congestion. The ST 501 may then be responsive to the reduction in its BoD requests—without potential loss of traffic—by simply aggregating more traffic for each request. This operation is generally easy to achieve during periods of high traffic demand. The transmitting ST 501 receives the BoD thresholds (an other bandwidth control parameters) from the NOC 507, and receives the bandwidth requests from the input access 501$b$. Then, for each cell that the ST 501 has traffic to send to, a BoD regulator 501$c$ determines the actual BoD requests that are to be sent up to the BCP 509 for that cell. A BoD controller 501$d$ within the transmitting ST 501 initiates the BoD requests to the BCP 509. Although shown separately, the BoD regulator 501$c$ may be integrated with the BoD controller 501$d$.

FIG. 6 shows a diagram of the available bandwidth control mechanism (ABCM) utilized in the system of FIG. 5. A satellite communication system 600 includes numerous transmitting STs) (not shown), which offer traffic 606 to a satellite 601. In turn, the satellite 601 forwards the traffic 608 to the appropriate receiving STs (not shown). It should be noted that all STs possess the capability to transmit and receive traffic (as mentioned previously); therefore, the labels, transmitting ST and receiving ST, pertain to the mode of operation of an ST at a particular time instance. The traffic reaches the receiving STs by downlink spot beams, which are electronically steerable by the satellite 601 to an earth surface area designated as a microcell.

Although possessing high bandwidth (for example, 450 Mbps), due to practical limitations of communications satellite design, the satellite 601 utilizes a relatively low number of spot beams when compared with the number of microcells. In an exemplary embodiment, the satellite communication system 600 has 1200 microcells, and the satellite supports 24 spot beams. Accordingly, the spot beams are time shared among the microcells. This is accomplished by a scheduler 603. The scheduling process is performed as required, in light of the fact that the receive traffic requirements of the various microcells may vary by a considerable amount, and that there may be competition among the microcells for available scheduler bandwidth. The scheduler 603 provides a self-monitoring function to output scheduler bandwidth metrics; for example, by utilizing the Yes and No counters, as discussed previously.

The satellite 601 provides temporary storage of traffic (i.e., packet bursts), which await assignment by the scheduler 603 to a destination microcell. The traffic storage is provided by a switch 609, employing separate (logical) queues 605 that correspond to the individual microcells. It is recognized by one of ordinary skill in the art that any type of switches can be used; e.g., cell-based switches and frame-based switches. That is, the queues 605 store the traffic that are received from the transmitting STs (not shown). The scheduler 603 serves the queues 607 of the switch 609. Within the satellite 601, a Bandwidth Control Processor (BCP) 611, as previously discussed, regulates the granting and denial of bandwidth requests from the transmitting STs, thereby limiting the amount of traffic that the switch 609 processes.

During busy periods for the system 600, the traffic demand to some microcells may greatly exceed the capacity of the microcell to receive traffic. Without traffic control to mitigate this situation, the queues 607 for such microcells would quickly fill and overflow, causing the switch 609 to become congested for those microcells and to drop packets. This congested state of the switch 609 negatively impacts system performance.

Thus, it is highly desirable that such switch congestion be avoided, and that the transmitting STs be given the opportunity to shed excess traffic gracefully. Another concern is that the amount of bandwidth that is available for potentially congested microcells is likely to vary dynamically due to competition and potential interference with other microcells.

Consequently, the satellite communication system 600 employs a traffic control processing logic 613. The interaction between the traffic control processing logic 613, the scheduler 603, and the BCP 611 constitutes an Available Bandwidth Control mechanism (ABCM) that can dynamically adapt to traffic conditions to avoid congestion within the satellite communication system 600. As shown in FIG. 6, the traffic control processing logic 613 is located external to the satellite 601; for example, the traffic control processing logic 613 may reside in a NOC 507 (FIG. 5). In a system in which processing resources are a concern, implementing the traffic control processing logic 613 at a site remote from the satellite 601 would be preferable, so that the processing and power resources of satellite 601 can be utilized for other functions. However, depending on the specific application of the satellite communication system 600, the traffic control processing logic 613 may alternatively be housed within the satellite 601. In other words, the traffic control processing logic functions may be placed within the satellite 601 or within a ground-based center (e.g., NOC).

For explanatory purposes, FIG. 6 illustrates an embodiment in which the traffic control processing logic 613 is placed in the NOC 507 (FIG. 5). The ABCM, of which the traffic control processing logic 613 is a key part effectively provides a real-time traffic control loop. The traffic control processing logic 613 includes a microcell utilization module 615 for determining utilization, an error calculation module 617 for comparing the computed utilization with a target utilization, a gain and filtering module 619 for computing a correction value, an adder 621 for outputting a control value, and a control storage 623 for storing the control values. It is known to the art that congestion avoidance operation may be obtained by controlling traffic admittance to the network such that the determined utilization is less than 100%, and herein specifically that it should approximate the designated target utilization. The operation of the traffic control processing logic 613 is more fully described with respect to FIG. 7.

Figure 7:
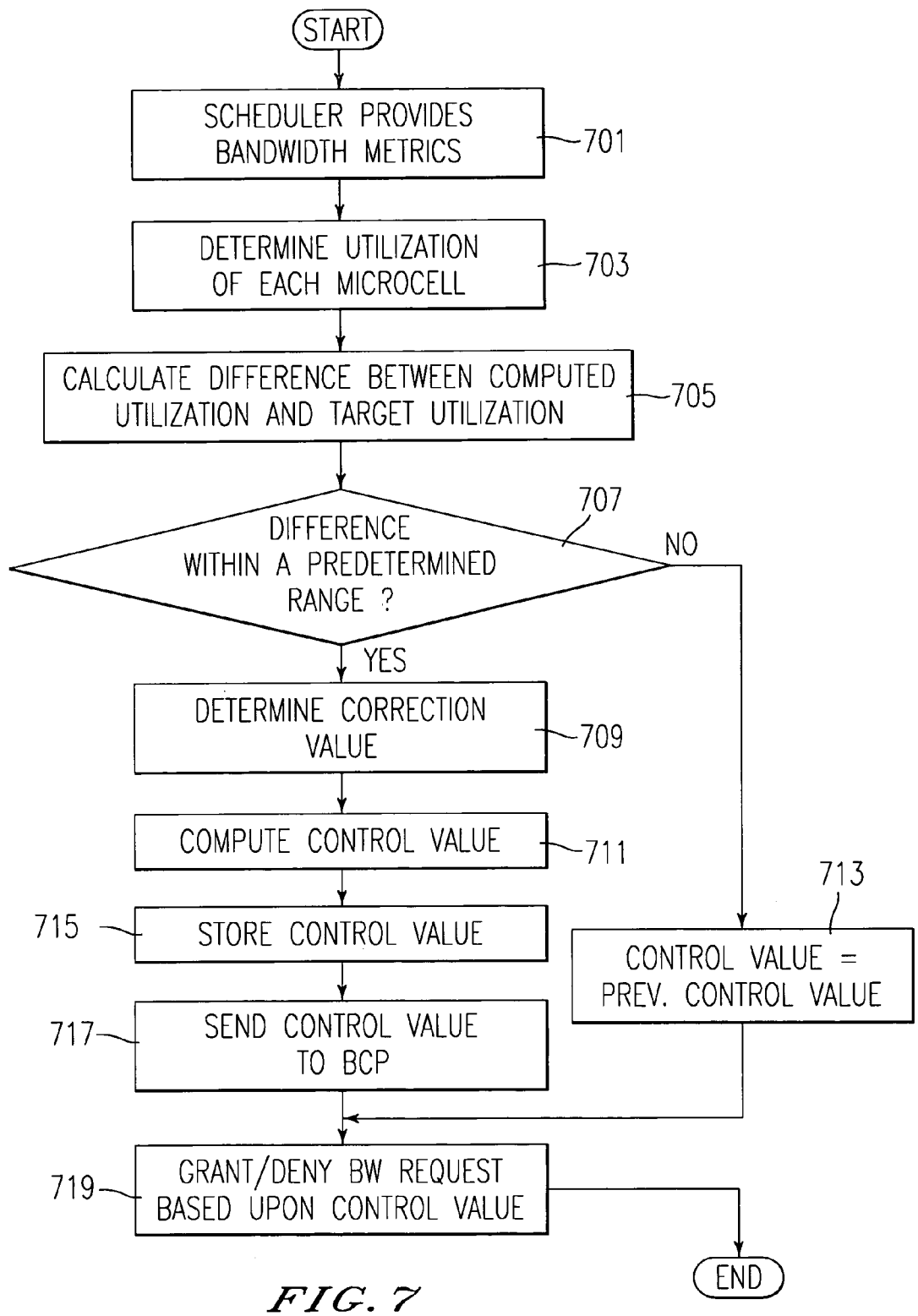
FIG. 7 is a flow chart of the operation of the available bandwidth control mechanism of FIG. 6.

FIG. 7 shows a flow chart of the operation of the available bandwidth control mechanism (ABCM) of FIG. 6. For a given measurement period, the scheduler 603 monitors the traffic that is assigned for transmission to a microcell, gathering the metrics associated with the observed traffic that is processed from the queues 607. In an exemplary embodiment, the metrics are the counter values of the Yes counter and the No counter, as described above with respect to FIG. 5. The counters are incremented from the start of a measurement period until the period expires; the measurement period can be set to any prescribed time interval, depending on the desired response of the traffic control processing logic 613. At the completion of a measurement period, the scheduler 603, as in step 701, provides the collected bandwidth metrics on each microcell of interest to the traffic control processing logic 613. These metrics are formulated in a message and sent to the traffic control processing logic 613 by the satellite 601, where they are received by a utilization module 615. In step 703, the utilization module 615 determines the utilization of each microcell. In particular, based on the received bandwidth metrics, the utilization module 615 calculates utilization for each microcell as follows:

$$\text{Utilization} = \text{Carried}/(\text{Carried} + \text{Additional}), \quad \text{Eq. (5)}$$

where Carried represents the actual traffic transmitted to a microcell and Additional represents available but unused bandwidth. The units of the Carried and Additional parameters may be any convenient, consistent units; e.g., megabits-per-second, kilo-packets-per-second (kpps), or bursts-per-millisecond.

It is recognized by one of ordinary skill in the art that Eq. (5) has general utility. When embodied into a system, such as system 500, which utilizes a scheduler 513, that provides Yes and No counters, the specific implementation of Eq. (5) reduces to that of Eq. (4).

For each microcell, there is a target utilization, which is a parameter that may be fixed or may be adaptive to general traffic conditions. To avoid congestion and possible packet loss, the utilization for any microcell should be less than 100%. Accordingly, the target utilization may initially be set to a default value of, for example, 95%, and may subsequently be tailored to reflect the traffic pattern corresponding to the particular microcell. In step 705, the error calculation module 617 computes the difference (or error) between the computed utilization and a corresponding target utilization for each microcell according to the following equation:

$$\text{Error} = \text{Target} - \text{Utilization}, \quad \text{Eq. (6)}$$

where Error and Target are dimensionless fractions. Alternatively, the Error may be expressed in traffic units, as follows:

$$\text{Error} = (\text{Target}/100) * (\text{Carried} + \text{Additional}) - \text{Carried} \quad \text{Eq. (7)}$$

For computational efficiency, the above Error value is formulated to exhibit the same polarity as that of the Correction value (i.e., all positive values or all negative values). Next, in step 707, the error calculation module 617 determines whether or not the difference between the computed utilization and the corresponding target utilization is within a predetermined range (e.g., 3% variation). If the utilization of a particular microcell matches the Target value or falls within the predetermined range, then zero error is determined. If the difference falls outside the predetermined range, then the Correction value, as in step 709, is determined. For each microcell, any significant error is passed on to the gain and filtering module 619, which determines the correction value.

According to an exemplary embodiment, the difference represents the correction value (or error value); the direct use of the Error value as the Correction value produces a unity loop gain.

Although the Error value may be directly used as the Correction value, it is often desirable to employ additional processing. The bandwidth metric values from the scheduler 603 may exhibit noisy fluctuations, especially if the measurement periods are of short durations. In this case, it may be desirable for module 619 to employ mechanism for filtering and/or smoothing of the measurement samples.

Additionally, it may be desired to deliberately slow the response of the traffic control loop of the ABCM, in which case the gain and filtering module 619 of the traffic control processing logic 613 may employ an algorithm gain that is less than unity. Alternatively, it may be desirable to achieve a fast-attack to correct utilization excesses and/or achieve a slow-increase of the carried traffic when the utilization is nearing the target value. In such a case, split gain may be used. In addition, the gain and filtering module 619 provides reconciliation of any differences in the operating intervals or units employed between the BCP 611 and the scheduler 603.

Thereafter, the Control Value is computed from the Correction value. The output of the gain and filtering module 619 (which is the Correction value) is input to an adder 621.

The Control Value that is output from the adder 621 is based on the following:

$$\text{New Control Value} = \text{Reference Control Value} + \text{Correction Value}. \quad \text{Eq. (8)}$$

The Reference Control Value is the Control Value that was previously transmitted to the BCP 611 during the measurement period that produced the metrics that were used in deriving the current Correction value. A key value for facilitating this correlation is that of a Round-Trip Control Time (RTCT). This RTCT is the time between successive, causal adjustments in the Control Values. The RTCT includes all causal delays in one round trip of the control loop; e.g., propagation delays, message transmission/reception delays, message processing delays, the measurement period, etc.

For Reference Control Value lookup purposes, in one embodiment of the present invention, the RTCT value is converted into an index value that represents how many Control Value messages ago that the Reference Control Value was sent out. In the case in which the Control Value messages are sent out at regular intervals, and for which $RTCT_{seconds}$ is known, the index is computed as follows:

$$RTCT_{Index} = Int.[RTCT_{seconds}/\text{Interval}], \quad \text{Eq. (9)}$$

where Int. [ ] represents the value of the division, wherein any fractional part is rounded up to the next integer. For example, if the RTCT is 1.7 seconds, and the message interval is 0.5 seconds, then $RTCT_{Index}$ equals 4.

However, if the RTCT is not constant or is otherwise uncertain, then an adaptive approach is used to obtain either the Reference Control Values or $RTCT_{Index}$. The Reference Control Values may be obtained from the BCP 611 by reading those control values that were active during the measurement period. The BCP 611 sends the appropriate prior control values to the traffic control processing logic 613 along with the current bandwidth metrics. Under this approach, the control storage 623 is not required. This approach is particularly effective when the traffic control processing logic 613 is collocated with the scheduler 603. If the traffic control processing logic 613 is not collocated with the scheduler 603 (e.g., ground based), then storing the values locally within the traffic control processing logic 613 may be preferable, as this may represent a significant amount of control information.

In step 711, the Correction value is applied to a selected, previously stored Control Value for the microcell to produce a new Control Value for the particular microcell. On the other hand, if the difference falls within the predetermined range that corresponds to zero error, then the new Control Value is set to the previous Control Value (step 713). The New Control Value is stored for later use in control storage 623, per step 715.

According to an embodiment of the present invention, the control storage index can be dynamically determined without the requirement that the RTCT be known or constant. As the gain and filtering module 619 produces the Correction values, the module 619 also produces Control Sequence Numbers (CSNs) to correspond to the new Control Values. The CSNs follow a modulo-n function (i.e., the numbering is cyclic). The CSN is stored in the control storage 623 and is sent to the BCP 611, which also stores the CSN locally. When the bandwidth metrics are determined by scheduler 603, scheduler 603 also reads the value of the CSN that is associated with the measurement period. Scheduler 603 includes the CSN with the metrics in the message that is transmitted to the traffic control processing logic 613. Thus, when the Correction values are determined from these metrics, as in step 709, the respective CSNs are employed as indices into a table within the control storage 623, yielding the proper Reference Control Values, to be employed by the adder 621.

In step 717, the Control Value is sent within a message to the BCP 611 in the satellite 601. Accordingly, the BCP 611 regulates the uplink traffic from the transmitting STs, per step 719, such that, during any one bandwidth allocation period, the traffic authorized by the BCP 611 for any particular microcell does not exceed the limit established by the traffic control processing logic 613 for that microcell. It is noted that the actual traffic admitted to the switch 609 and stored in the queue 607 for a particular microcell may be less than the limit authorized by the traffic control processing logic 613 if the aggregate transmitting ST demand to the microcell is less than this limit (as specified by the Control Value).

The scheduler 603 responds adaptively, assigning bandwidth as may be available to those microcells whose queues contain traffic. For some microcells, the scheduler 603 may have additional bandwidth available beyond that of the actual carried traffic for the microcell. The monitoring function of the scheduler 603 collects and reports, at least, the carried and available bandwidth for each microcell of interest, initiating a repeat of the steps 701–719 for each such microcell.

As part of a traffic control loop, the traffic control processing logic 613 is stable at unity gain for which, in response to a transient, the logic 613 exhibits neither overshoot nor undershoot. It is observed that a causal correction cannot be made faster than one RTCT. The traffic control processing logic 613 advantageously provides 100% of the indicated correction in exactly one RTCT with stable loop operation. This characteristic of the present invention provides a major improvement over conventional systems. Given its adaptive capability, the traffic control processing logic 613 is well-suited for bursty traffic whose bandwidth needs are not known in advance. That is, no prior assumptions as to traffic profiles or patterns are required for the operation of the traffic control processing logic 613. Consequently, the traffic control processing logic 613 is also adaptive to the presence of allocated traffic. This transparency to the traffic pattern advantageously enhances operation of communication system 600, by significantly reducing, for example, the operational load on a system operator.

To better appreciate the present invention, it is instructive to analyze the performance (i.e., loop gain) of the ABCM and compare it with that of a conventional approach.

The transient performance of the closed-loop traffic control algorithm of FIG. 6 significantly impacts the system performance. The transient performance is characterized by a combination of the speed of response, post-transient stability including lack of any ringing, and accuracy in maintaining the desired bandwidth limit when subjected to varying degrees of available bandwidth and of the actual traffic due to any traffic allocations. If the loop responds too slowly, then any sudden decrease in bandwidth available to a queue 605 may result in an unacceptable amount of packet loss stemming from queue overflow. Conversely, if additional bandwidth suddenly becomes available, and the loop is slow to react, then this temporarily available bandwidth may be lost to the system 600. This dynamic behavior is largely dependent on the gain and reference mechanisms employed, the control loop's RTCT, and the values for the several gain parameters to be employed.

The overall loop gain is the product of two gains: the algorithm gain and a message gain. For the system of FIG. 6, the algorithm gain is that of module 619. One simple, but effective implementation of the gain function for module 619 is to relate the Error of Eq. (7) with the Correction Value of Eq. (9) by a simple linear factor:

$$\text{Correction Value} = \text{Gain} * \text{Error} \quad \text{Eq.(10)}$$

This Gain parameter basically determines the speed with which the bandwidth control limits are updated in response to a transient. Conceptually, a simple, but effective form of bandwidth adjustment is obtained by combining Eq. (10) with Eq. (7) to obtain:

$$\text{New Control Value} = \text{Reference Control Value} + \text{Gain} * \text{Error} \quad \text{Eq. (11)}$$

Under the conventional approach, after Eq. (11) is evaluated, the Reference Control Value to be used for the next evaluation of Eq. (11) is often taken as:

$$\text{Reference Control Value} = \text{New Control Value} \quad \text{Eq.(12)}$$

The operation represented by combining Eqs. (11) and (12) is described herein as an incremental approach. Ideally, one would like the Gain of Eq. (11) should be unity (i.e., 1.00). With unity gain, when an error is observed, the Control Values are corrected promptly and exactly (within measurement errors). However, the post-transient response can be greatly impaired, and even become unstable, with unity Gain stemming from the message gain effect.

Conceptually, the message gain is an integer that equals the number of outstanding messages in the traffic control loop rounded up to the nearest whole message. This gain effect is dependent on both the RTCT and the message update interval for the bandwidth control loop of a system such as 600. For ground-based control of satellite bandwidth, RTCT is typically about 1.5 to 2 seconds, and message intervals typically range from 250 to 750 msec.

As an example, it is assumed that RTCT equals 4 message intervals and that a first measurement arrives at the traffic control processing logic 613, indicating a need for a +10 kilo-packets per second (kpps) correction in bandwidth, which is made via a New Control Value. If no other impairment occurred, then the second measurement would exhibit the same values as the second measurement, due to the RTCT delays; i.e., the second measurement could not possibly have yet been influenced by the first bandwidth correction. With the above incremental approach, the gain mechanism then calculates another +10 kpps correction in bandwidth, and adds this to the control value that was previously calculated. The same is true for the third and fourth messages, for which two additional +10 kpps corrections are made. These corrections accumulate to yield an overall correction of +40 kpps. However, the indicated error was only +10 kpps. This effect represents a message gain of 400%. Thus, for this RTCT, the overall loop gain equals 4*Gain. Because the overall loop gain should be less than one for stable operation, the algorithm Gain value needs to be constrained as follows:

$$\text{Gain} < 1.00/\text{Message Gain} = 1.00/4 = 0.25 \qquad \text{Eq. (13)}$$

Conceptually, for a Gain of 0.25, the four corrections accumulate to 10 kpps (2.5+2.5+2.5+2.5). This operation, however, is on the verge of oscillation.

Figure 8:
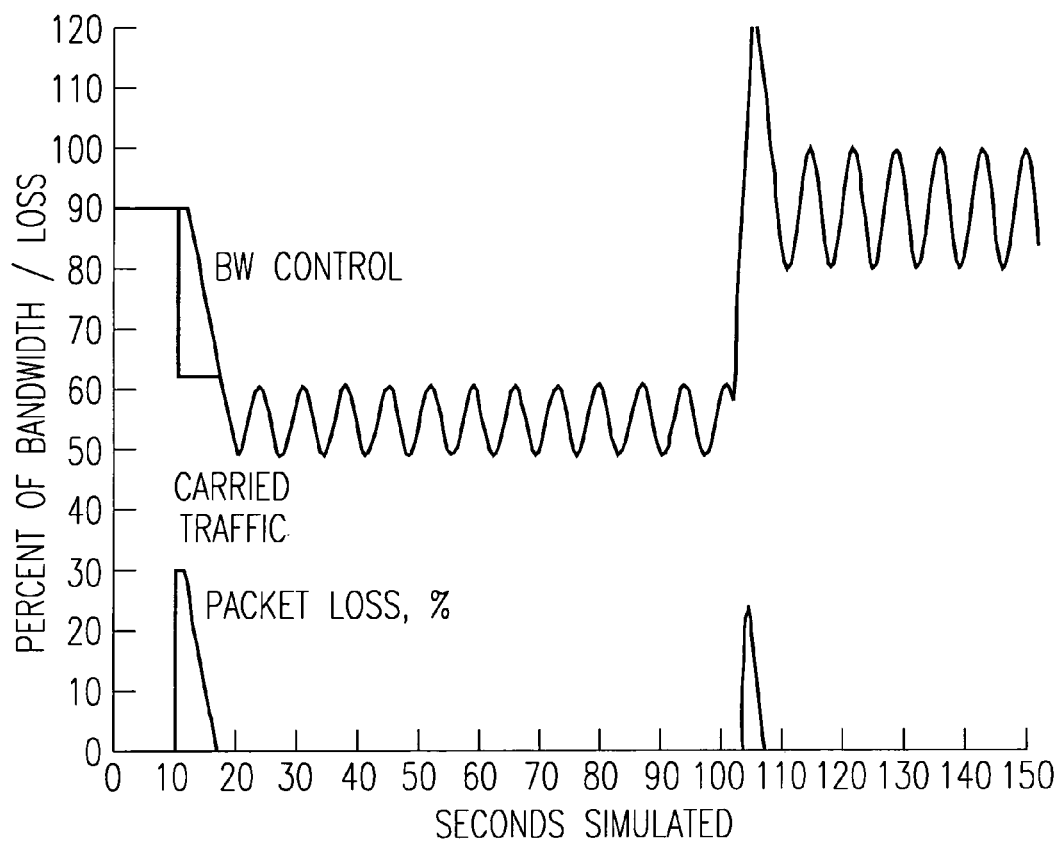
FIG. 8 is a graph of the response of an incremental bandwidth adjustment mechanism with a critically-damped gain.

FIG. 8 shows a graph of an incremental bandwidth adjustment mechanism that employs a critically-damped gain. For all simulations (FIGS. 8–10), the top trace, middle trace, and lower trace represent the Control Value, the Carried traffic, and the percentage of packet loss, respectively. A standard simulation model is defined that employs large transients in order to evaluate the mechanisms herein for their transient response characteristics. A message interval of 500 msec and a RTCT of 2 seconds (4 message intervals) are assumed. The traffic is characterized by any arbitrary units. The initial bandwidth available is 100 units. The offered traffic is set to 150 units (congestion), the Target utilization is set to 90%, and the initial value of the Control Value is set to 90 units. These initial conditions represent a stable operating point. For this evaluation of transient response, at 10 seconds an abrupt drop in bandwidth available to 60 units is applied, remaining at this value until 100 seconds and abruptly returning to 100 units. At 10 seconds, this transient model causes 30% packet loss for at least 2 seconds (the RTCT), as no control can react faster than one RTCT. These simulation results are of an incremental bandwidth adjustment mechanism that is based upon Eqs. (11) and (12). For this simulation, a value for Gain has been determined (e.g., 11%), such that a critically damped response is achieved. Prior to 10 seconds, the carried traffic equals 90 units (Target*Available= 0.90*100). At 10 seconds the Carried traffic suddenly drops to that which is available, 60 units (while the Control Value is still at 90 units); thus, immediate packet loss occurs. However, 34 seconds lapse for the New Control Value to drop to the Carried traffic value, at which point New Control Value begins to regulate the Carried traffic. For this entire period, there is high degree of packet loss, yielding an undesirable loss recovery time of 24 seconds.

Both Control Value and Carried traffic drop to 55 units at 39 seconds, and reach the stable value of 54.0 units (90% of 60 units) at 44.5 seconds, for which there is no undershoot. The bandwidth recovery transient (subsequent to 100 seconds) exhibits no overshoot, reaching 89 units at 110 seconds, and the stable value of 90.0 units at 114.5 seconds. The recovery period is in the order of 10–14.5 seconds, which is also slow.

Figure 9:
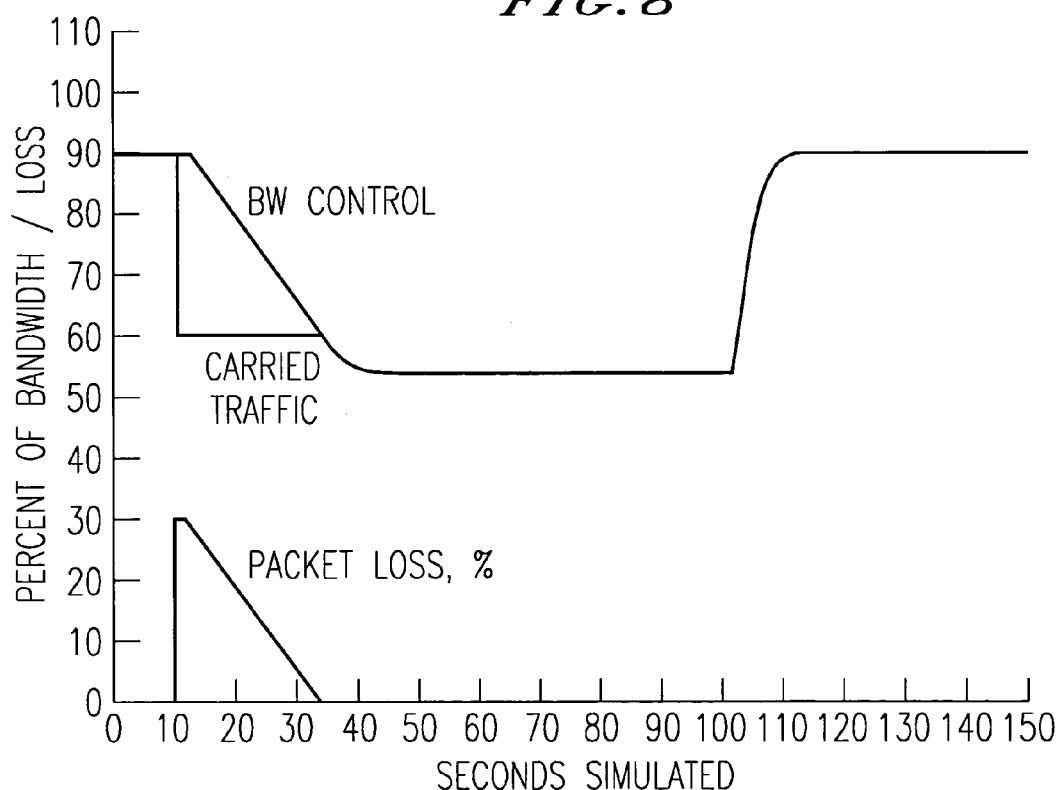
FIG. 9 is a graph of the response of an incremental bandwidth adjustment mechanism with a high gain.

FIG. 9 is a graph of an incremental bandwidth adjustment mechanism with a high gain. In particular, FIG. 9 illustrates the simulation results of a mechanism that attempts to reduce the 24 second loss period by using a high value for gain. This simulation is the same the previous case (FIG. 8), but for a gain setting of 45%. Indeed, the (initial) loss period has been reduced to a duration of 7.5 seconds, but at the expense of unstable behavior and significant additional losses at other times.

FIGS. 8 and 9 illustrate basic performance deficiencies with conventional systems. The message gain effect, however, can be nullified by appropriate implementation of the teachings of the present invention; in particular, the employment of an appropriate selection for the Reference Control Value as with the ABCM, below, in contrast to the conventional approach rather than that of previous art, as with Eq. (12).

The ABCM mechanism makes direct, immediate bandwidth changes and avoids the message gain effect, thereby providing an ideal transient response. In other words, it is desirable to make an immediate correction to any indicated changes, in which 100% of the indicated correction (error) is made in one step, and in one RTCT. In addition to these considerations, stability needs to be addressed. The ABCM mechanism provides stability of the traffic control loop by correlating the appropriate Reference Control Values (RCVs) with the respective measurement periods. The ABCM mechanism is further described, as follows:

$$\text{New Control Value} = \text{RCV} + \text{Correction Value} = \text{RCVj} + \text{Function(Measurementj)} \qquad \text{Eq. (14)}$$

where, j designates some particular RCV and the bandwidth measurements resulting from this RCV. As evident from Eq. (14), the RCV that is to be used is not that of the previous value of New Control Value, as with Eq. (12), but rather that of the New Control Value that was active when the measurement was made. This correlation may be facilitated by means such as Control Storage 623. Under this approach, the Gain parameter can be set to 100% with complete closed-loop stability. As a result, 100% of the indicated correction can be made in a single correction step, with zero overshoot and zero undershoot—thus obtaining an ideal transient response. Furthermore, Eq. (14) is independent of the RTCT.

In accordance to an embodiment of the present invention, enhanced performance with respect to large transients may be obtained by modifying Eq. (5) as follows:

$$\text{Utilization} = 100\% * (\text{Offered\_to\_queue}) / (\text{Carried} + \text{Additional}) \qquad \text{Eq. (15)}$$

This formulation provides "attempted utilization" indications of greater than 100% for the case when the queue is congested or beginning to become congested, as might be due to an abrupt transient. According to the present invention, an improved formulation of Error is then obtained by using Eq. (15) to revise Eq. (7), as follows:

$$\text{Error} = (\text{Target}/100) * (\text{Carried} + \text{Additional}) - \text{Offered\_to\_queue} \qquad \text{Eq. (16)}$$

For purposes of comparison to Eq. (5), an approximation to Offered_to_queue is (Carried+Loss), where Loss is the queue input overflow. This approximation yields:

$$\text{Error} = (\text{Target}/100) * (\text{Carried} + \text{Additional}) - (\text{Carried} + \text{Loss}), \qquad \text{Eq. (17)}$$

where Loss is the term that is in addition to that of Eq. (5). In general, either Loss or Additional will be zero. In operation near the designated Target utilization, Additional will have a small, positive value and Loss will be zero. For the (occasional) large traffic increase transient, Additional will be zero and Loss will have a significant value.

According to one embodiment of the present invention, an implementation of Eq. (14) may be obtained by employing for the indicated Function a linear gain mechanism, such as Eq. (10), which results in the following expression:

$$\text{New Control Value} = \text{RCV} + \text{Correction Value} = \text{RCVj} + \text{Gain} \ast \text{Errorj} \qquad \text{Eq. (18)}$$

where Error is calculated from the metrics such as that of Eq. (7) or Eq. (16). In contrast to Eq. (12), the prior value of New Control Value is irrelevant to Eq. (18). It is noted that although the above Eq. (10)–(18) are described on a per-queue basis it is recognized that these equations apply individually to all queues 607 that are being controlled.

Figure 10:
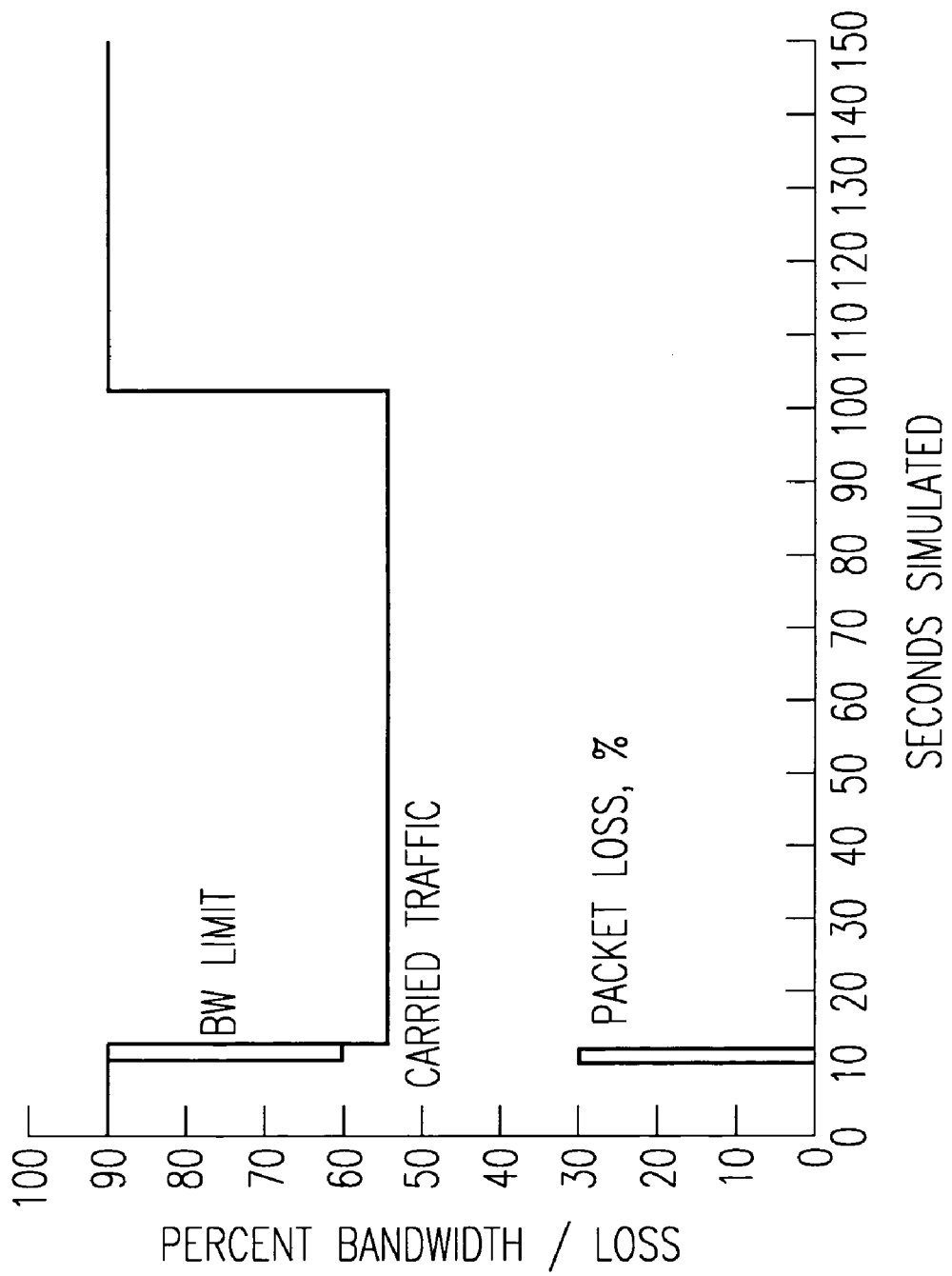
FIG. 10 is a graph of the response of the ABCM with unity gain, according to an embodiment of the present invention.

FIG. 10 is a simulation graph of an available bandwidth control mechanism using unity gain, according to an embodiment of the present invention based upon the mechanisms of Eqs. (17) and (18). At about 12 seconds, both Control Value and the Carried traffic drop in value to the exact stable point of 54 units, and for which there is no undershoot. The loss recovery period is at the theoretical minimum of one RTCT (2 seconds). The bandwidth recovery transient is also ideal, in that there exists no overshoot, reaching the stable value of 90.0 units at 102.0 seconds (again within the ideal response time of one RTCT).

As a mechanism for relating Error to Correction Value, split gain is a form of nonlinear gain that can be used to either mitigate the message gain effect for the incremental approach or to implement a form of fast release and/or slow increase policy for the ABCM approach. In general, the "Gain" can be characterized as follow:

$$\text{Correction Value} = \text{GAIN}(\text{Error}, <\text{other factors}>) \qquad \text{Eq. (19)}$$

With split gain, the gain factor is a different constant for bandwidth increases than for bandwidth decreases, as represented below by Eq. (20).

$$\text{Correction Value} = gainUP \ast \text{Error}, \text{Error} > 0 \qquad \text{Eq. (20)}$$
$$gainDn \ast \text{Error}, \text{Error} \leq 0$$

where gainUp is used for bandwidth increases. A flat gain operation is used if gainDn is set equal to gainUp; e.g., for unity gain operation gainUp=gainDn=1.00.

With the ABCM, the baseline is to use unity gain, as this produces ideal transient response with respect to step transients. However, for potential performance optimization it may be desirable to employ a split gain Eq. (20) mechanism to implement a fast release and/or a slow increase policy. A slow increase response is provided with gainUp less than 1.00. With slow increase, additional bandwidth that becomes suddenly available is not entirely acquired in one step. Study of field data has shown that retaining some of this additional bandwidth for a short time can, statistically, mitigate frame errors for bandwidth-coupled microcells. A fast release response is provided with gainDn>1.00. With fast release, a controlled amount of overshoot is used in responding to a sudden decrease in bandwidth. For example, assume that a sudden decrease in available bandwidth has just been initiated for which the traffic control processing logic 613 receives an indication that it must correct for a 20 Mbps drop. It may be assumed, statistically, that the available bandwidth may drop even a little further, perhaps another 10 Mbps during the next measurement period. This estimation is equivalent to using a gainDn of 1.50. The benefit of this approach is that there can be significantly less likelihood of corrupted data packets for moderately fast reductions, at only a slight decrease in bandwidth used. In these situations, a net increase in margin is obtained by the use of some overshoot. With this use of the RCV function, the loop is stable for gainDn even much greater than one, providing that gainUp≦1.00. Therefore, split gain can be employed in the ABCM to tailor the transient response.

Figure 11:
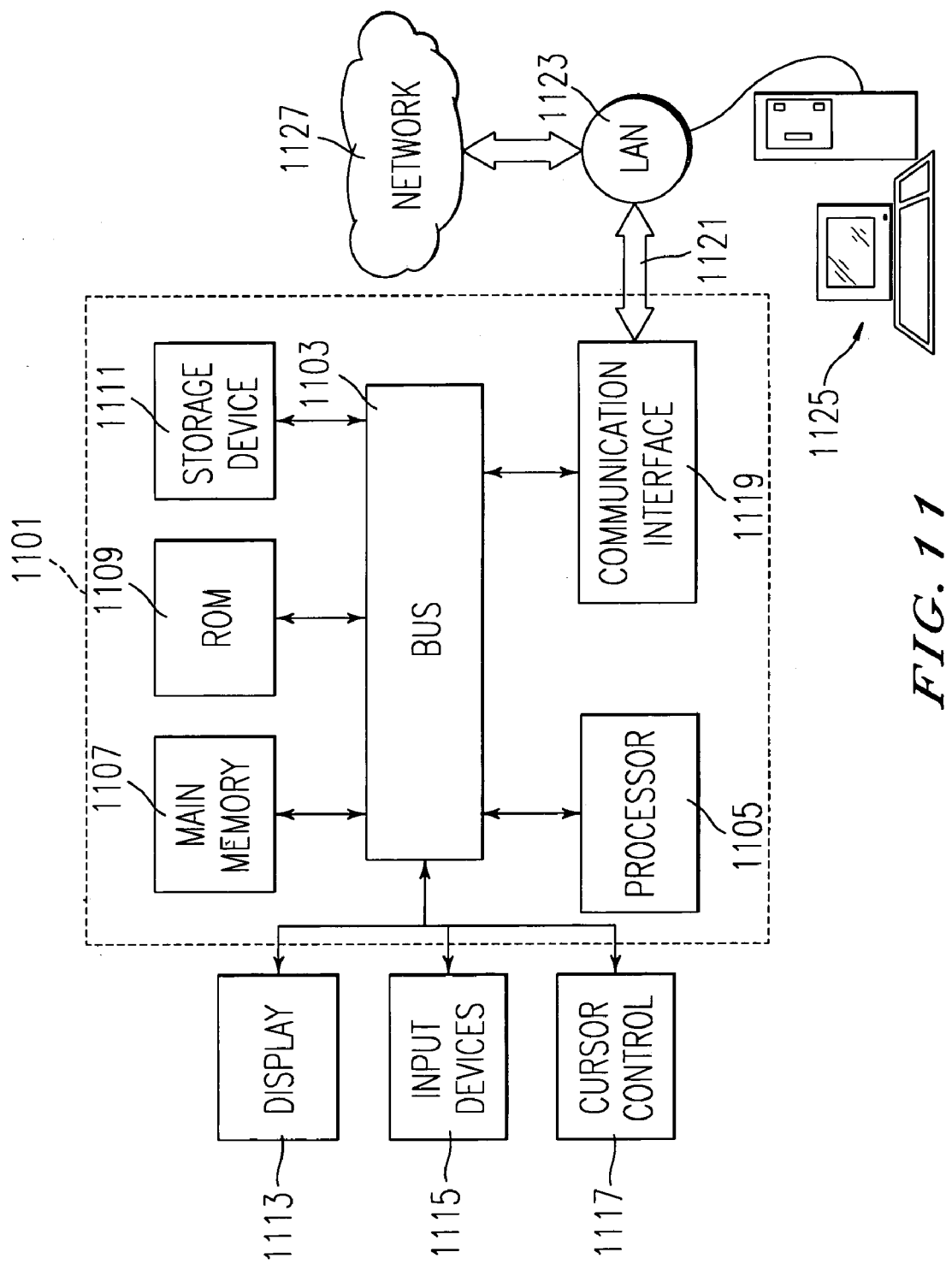
FIG. 11 is a diagram of a computer system that can perform the functions of the ABCM to avoid congestion, in accordance with an embodiment of the present invention.

FIG. 11 illustrates a computer system 1101 upon which an embodiment according to the present invention may be implemented to perform congestion avoidance. Computer system 1101 includes a bus 1103 or other communication mechanism for communicating information, and a processor 1105 coupled with bus 1103 for processing the information. Computer system 1101 also includes a main memory 1107, such as a random access memory (RAM) or other dynamic storage device, coupled to bus 1103 for storing information and instructions to be executed by processor 1105. In addition, main memory 1107 may be used for storing temporary variables or other intermediate information during execution of instructions to be executed by processor 1105. Computer system 1101 further includes a read only memory (ROM) 1109 or other static storage device coupled to bus 1103 for storing static information and instructions for processor 1105. A storage device 1111, such as a magnetic disk or optical disk, is provided and coupled to bus 1103 for storing information and instructions.

Computer system 1101 may be coupled via bus 1103 to a display 1113, such as a cathode ray tube (CRT), for displaying information to a computer user. An input device 1115, including alphanumeric and other keys, is coupled to bus 1103 for communicating information and command selections to processor 1105. Another type of user input device is cursor control 1117, such as a mouse, a trackball, or cursor direction keys for communicating direction information and command selections to processor 1105 and for controlling cursor movement on display 1113.

According to one embodiment, the traffic control processing logic 613 (FIG. 6) is performed by computer system 1101 in response to processor 1105 executing one or more sequences of one or more instructions contained in main memory 1107. Such instructions may be read into main memory 1107 from another computer-readable medium, such as storage device 1111. Execution of the sequences of instructions contained in main memory 1107 causes processor 1105 to perform the process steps described herein. One or more processors in a multi-processing arrangement may also be employed to execute the sequences of instructions contained in main memory 1107. In alternative embodiments, hard-wired circuitry may be used in place of or in combination with software instructions. Thus, embodiments are not limited to any specific combination of hardware circuitry and software.

Further, the congestion avoidance mechanism of the present invention may reside on a computer-readable medium. The term "computer-readable medium" as used herein refers to any medium that participates in providing instructions to processor 1105 for execution. Such a medium may take many forms, including but not limited to, non-volatile media, volatile media, and transmission media. Non-volatile media includes, for example, optical or magnetic disks, such as storage device 1111. Volatile media includes dynamic memory, such as main memory 1107. Transmission media includes coaxial cables, copper wire and fiber optics, including the wires that comprise bus 1103. Transmission media can also take the form of acoustic or light waves, such as those generated during radio wave and infrared data communication.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1105 for execution. For example, the instructions may initially be carried on a magnetic disk of a remote computer. The remote computer can load the instructions relating to the notification services to control call processing remotely into its dynamic memory and send the instructions over a telephone line using a modem. A modem local to computer system 1101 can receive the data on the telephone line and use an infrared transmitter to convert the data to an infrared signal. An infrared detector coupled to bus 1103 can receive the data carried in the infrared signal and place the data on bus 1103. Bus 1103 carries the data to main memory 1107, from which processor 1105 retrieves and executes the instructions. The instructions received by main memory 1107 may optionally be stored on storage device 1111 either before or after execution by processor 1105.

Computer system 1101 also includes a communication interface 1119 coupled to bus 1103. Communication interface 1119 provides a two-way data communication coupling to a network link 1121 that is connected to a local network 1123. For example, communication interface 1119 may be a network interface card to attach to any packet switched local area network (LAN). As another example, communication interface 1119 may be an asymmetrical digital subscriber line (ADSL) card, an integrated services digital network (ISDN) card or a modem to provide a data communication connection to a corresponding type of telephone line. Wireless links may also be implemented. In any such implementation, communication interface 1119 sends and receives electrical, electromagnetic or optical signals that carry digital data streams representing various types of information.

Network link 1121 typically provides data communication through one or more networks to other data devices. For example, network link 1121 may provide a connection through local network 1123 to a host computer 1125 or to data equipment operated by a service provider, which provides data communication services through a communication network 1127 (e.g., the Internet). LAN 1123 and network 1127 both use electrical, electromagnetic or optical signals that carry digital data streams. The signals through the various networks and the signals on network link 1121 and through communication interface 1119, which carry the digital data to and from computer system 1101, are exemplary forms of carrier waves transporting the information. Computer system 1101 can transmit notifications and receive data, including program code, through the network(s), network link 1121 and communication interface 1119.

The techniques described herein provide several advantages over prior approaches to avoiding traffic congestion. A scheduler generates bandwidth metrics for a destination region (e.g., microcell). A traffic control processing logic receives the bandwidth metrics. The traffic control processing logic includes a utilization module that determines utilization associated with the destination site based upon the received bandwidth metrics, and an error calculation module that computes the difference between the determined utilization and a target utilization. A gain and filtering module, which is also a part of the traffic control processing logic, computes a correction value based upon the difference between the determined utilization and the target utilization, in which the correction value being associated with the destination site. Further, the traffic control processing logic includes an adder that outputs a control value based upon a reference control value and the correction value. A bandwidth control processor assigns bandwidth allocation based upon the control value. This approach advantageously provides enhanced system efficiency. Another advantage is that this arrangement optimizes system throughput.

Obviously, numerous modifications and variations of the present invention are possible in light of the above teachings. It is therefore to be understood that within the scope of the appended claims, the invention may be practiced otherwise than as specifically described herein.

What is claimed is:

1. A method for controlling bandwidth allocations, the method comprising:
   receiving bandwidth metrics for a destination site from a scheduler;
   determining utilization associated with a destination site based upon the received bandwidth metrics;
   computing a difference between the determined utilization and a target utilization;
   commuting a correction value based upon the difference between the determined utilization and the target utilization, the correction value being associated with the destination site;
   outputting a control value based upon a reference control value and the correction value, wherein the reference control value is based upon a current limit value that is active during a measurement period of the bandwidth metrics;
   allocating bandwidth based upon the control value; and
   correlating the control value with the received bandwidth metrics.

2. The method according to claim 1, wherein the correlating step comprises:
   generating a control sequence number corresponding to the control value.

3. A method for controlling bandwidth allocations, the method comprising:
   receiving bandwidth metrics for a destination site from a scheduler;
   determining utilization associated with a destination site based upon the received bandwidth metrics;
   computing a difference between the determined utilization and a target utilization;
   computing a correction value based upon the difference between the determined utilization and the target utilization, the correction value being associated with the destination site;
   outputting a control value based upon a reference control value and the correction value;
   allocating bandwidth based upon the control value; and reading a control sequence number associated with the measurement period, the control sequence number being included in a metric message that contains the bandwidth metrics.

4. A method for controlling bandwidth allocations, the method comprising:
receiving bandwidth metrics for a destination site from a scheduler;
determining utilization associated with a destination site based upon the received bandwidth metrics;
computing a difference between the determined utilization and a target utilization;
computing a correction value based upon the difference between the determined utilization and the target utilization, the correction value being associated with the destination site;
outputting a control value based upon a reference control value and the correction value;
allocating bandwidth based upon the control value; and
storing the control value, wherein the control value is indexed by a control sequence number.

5. A method for controlling bandwidth allocations, the method comprising:
receiving bandwidth metrics for a destination site from a scheduler;
determining utilization associated with a destination site based upon the received bandwidth metrics;
computing a difference between the determined utilization and a target utilization:
computing a correction value based upon the difference between the determined utilization and the target utilization, the correction value being associated with the destination site;
outputting a control value based upon a reference control value and the correction value, wherein the reference control value is stored in a control storage, and the reference control value having an index based upon a round-trio control time (RTCT), the RTCT being a time between sending of the control value and a subsequent control value; and
allocating bandwidth based upon the control value.

6. The method according to claim 5, wherein the RTCT includes propagation delay, message transmit/receive delays, and message processing delay.

7. The method according to claim 5, further comprising:
sending the control value on a predetermined interval, the index being based upon a ratio of the RTCT and the predetermined interval.

8. The method according to claim 5, further comprising:
sending the control value to a traffic control processing logic that is located remotely from the scheduler.

9. A method for controlling bandwidth allocations, the method comprising:
receiving bandwidth metrics for a destination site from a scheduler;
determining utilization associated with a destination site based upon the received bandwidth metrics;
computing a difference between the determined utilization and a target utilization;
computing a correction value based upon the difference between the determined utilization and the target utilization, and based upon a split gain that specifies at least one of a first gain and a second gain based upon the computed difference, the correction value being associated with the destination site;

outputting a control value based upon a reference control value and the correction value; and
allocating bandwidth based upon the control value.

10. A method for controlling bandwidth allocations, the method comprising:
receiving bandwidth metrics for a destination site from a scheduler;
determining utilization associated with a destination site based upon the received bandwidth metrics;
computing a difference between the determined utilization and a target utilization;
computing a correction value based upon the difference between the determined utilization and the target utilization, and based upon a unity gain, the correction value being associated with the destination site;
outputting a control value based upon a reference control value and the correction value; and
allocating bandwidth based upon the control value.

11. A communication system for controlling bandwidth allocations, comprising:
a scheduler configured to generate bandwidth metrics for a destination site; and
a traffic control processing logic configured to receive the bandwidth metrics, the traffic control processing logic comprising,
a utilization module configured to determine utilization associated with a destination site based upon the received bandwidth metrics,
an error calculation module configured to compute a difference between the determined utilization and a target utilization,
a gain and filtering module configured to compute a correction value based upon the difference between the determined utilization and the target utilization, the correction value being associated with the destination site, and
an adder configured to output a control value based upon a reference control value and the correction value, wherein the reference control value is based upon a current limit value that is active during a measurement period of the bandwidth metrics, the current limit value being received by the traffic control processing logic; and
a bandwidth control processor configured to perform bandwidth allocation based upon the control value; and
wherein the gain and filtering module generates a control sequence number corresponding to the control value.

12. The system according to claim 11, wherein the scheduler reads the control sequence number associated with the measurement period, the control sequence number being included in a metric message that contains the bandwidth metrics.

13. The system according to claim 11, wherein the traffic control processing logic further comprises:
a control storage configured to store the control value, the control value being indexed by the control sequence number.

14. The system according to claim 11, wherein the reference control value is stored in the control storage, the reference control value having an index based upon a round-trip control time (RTCT), the RTCT being a time between sending of the control value and a subsequent control value.

15. The system according to claim 14, wherein the RTCT includes propagation delay, message transmit/receive delays, and message processing delay.

16. The system according to claim 14, wherein the control value is sent to the traffic control processing logic on a predetermined interval, the index being based upon a ratio of the RTCT and the predetermined interval.

17. A communication system for controlling bandwidth allocations, comprising;
a scheduler configured to generate bandwidth metrics for a destination site; and
a traffic control processing logic configured to receive the bandwidth metrics, the traffic control processing logic comprising,
a utilization module configured to determine utilization associated with a destination site based upon the received bandwidth metrics,
an error calculation module configured to compute a difference between the determined utilization and a target utilization,
a gain and filtering module configured to compute a correction value based upon the difference between the determined utilization and the target utilization, the correction value being associated with the destination site, and
an adder configured to output a control value based upon a reference control value and the correction value; and
a bandwidth control processor configured to perform bandwidth allocation based upon the control value; and
wherein the scheduler resides in a payload of a satellite and the traffic control processing logic is located remotely from the satellite.

18. A communication system for controlling bandwidth allocations, comprising:
a scheduler configured to generate bandwidth metrics for a destination site; and
a traffic control processing logic configured to receive the bandwidth metrics, the traffic control processing logic comprising,
a utilization module configured to determine utilization associated with a destination site based upon the received bandwidth metrics,
an error calculation module configured to compute a difference between the determined utilization and a target utilization,
a gain and filtering module configured to compute a correction value based upon the difference between the determined utilization and the target utilization, and based upon a split gain that specifies at least one of a first gain and a second gain based upon the computed difference, the correction value being associated with the destination site, and
an adder configured to output a control value based upon a reference control value and the correction value; and
a bandwidth control processor configured to perform bandwidth allocation based upon the control value.

19. A communication system for controlling bandwidth allocations, comprising
a scheduler configured to generate bandwidth metrics for a destination site; and
a traffic control processing logic configured to receive the bandwidth metrics, the traffic control processing logic comprising,
a utilization module configured to determine utilization associated with a destination site based upon the received bandwidth metrics,
an error calculation module configured to compute a difference between the determined utilization and a target utilization,
a gain and filtering module configured to compute a correction value based upon the difference between the determined utilization and the target utilization, and based upon a unity gain, the correction value being associated with the destination site, and
an adder configured to output a control value based upon a reference control value and the correction value; and
a bandwidth control processor configured to perform bandwidth allocation based upon the control value.

20. A traffic control processing device for managing available bandwidth based upon bandwidth metrics from a scheduler, comprising:
a utilization module configured to determine utilization associated with a destination site based upon the received bandwidth metrics;
an error calculation module configured to compute a difference between the determined utilization and a target utilization;
a gain and filtering module configured to compute a correction value based upon the difference between the determined utilization and the target utilization, the correction value being associated with a destination site:
an adder configured to output a control value based upon a reference control value and the correction value, wherein the reference control value is based upon a current limit value that is active during a measurement period of the bandwidth metrics, the current limit value being received by the traffic control processing logic; and
wherein the gain and filtering module generates a control sequence number corresponding to the control value.

21. The device according to claim 20, wherein the scheduler reads the control sequence number associated with the measurement period, the control sequence number being included in a metric message that contains the bandwidth metrics.

22. The device according to claim 20, wherein the traffic control processing logic further comprises:
a control storage configured to store the control value, the control value being indexed by the control sequence number.

23. The device according to claim 20, wherein the reference control value is stored in the control storage, the reference control value having an index based upon a round-trip control time (RTCT), the RTCT being a time between sending of the control value and a subsequent control value.

24. The device according to claim 23, wherein the RTCT includes propagation delay, message transmit/receive delays, and message processing delay.

25. The device according to claim 23, wherein the control value is sent to the traffic control processing logic on a predetermined interval, the index being based upon a ratio of the RTCT and the predetermined interval.

26. A traffic control processing device for managing available bandwidth based upon bandwidth metrics from a scheduler, comprising:
a utilization module configured to determine utilization associated with a destination site based upon the received bandwidth metrics;
an error calculation module configured to compute a difference between the determined utilization and a target utilization;
a gain and filtering module configured to compute a correction value based upon the difference between the determined utilization and the target utilization, and based upon a split am that specifies at least one of a first gain and a second gain based upon the computed difference, the correction value being associated with the destination site; and an adder configured to output a control value based upon a reference control value and the correction value.

27. A traffic control processing device for managing available bandwidth based upon bandwidth metrics from a scheduler, comprising:

a utilization module configured to determine utilization associated with a destination site based upon the received bandwidth metrics;

an error calculation module configured to compute a difference between the determined utilization and a target utilization;

a gain and filtering module configured to compute a correction value based upon the difference between the determined utilization and the target utilization, and based upon a unity gain, the correction value being associated with the destination site; and an adder configured to output a control value based upon a reference control value and the correction value.

28. A computer-readable medium carrying one or more sequences of one or more instructions for controlling bandwidth allocations, the one or more sequences of one or more instructions including instructions which, when executed by one or more processors, cause the one or more processors to perform the steps of:

receiving bandwidth metrics for a destination site from a scheduler;

determining utilization associated with a destination site based upon the received bandwidth metrics;

computing a difference between the determined utilization and a target utilization;

computing a correction value based upon the difference between the determined utilization and the target utilization, the correction value being associated with the destination site;

outputting a control value based upon a reference control value and the correction value;

allocating bandwidth based upon the control value; and correlating the control value with the received bandwidth metrics.

29. A computer-readable medium carrying one or more sequences of one or more instructions for controlling bandwidth allocations, the one or more sequences of one or more instructions including instructions which, when executed by one or more processors, cause the one or more processors to perform the steps of:

receiving bandwidth metrics for a destination site from a scheduler;

determining utilization associated with a destination site based upon the received bandwidth metrics;

computing a difference between the determined utilization and a target utilization;

computing a correction value based upon the difference between the determined utilization and the target utilization, the correction value being associated with the destination site;

outputting a control value based upon a reference control value and the correction value;

allocating bandwidth based upon the control value; and generating a control sequence number corresponding to the control value.

30. A computer-readable medium carrying one or more sequences of one or more instructions for controlling bandwidth allocations, the one or more sequences of one or more instructions including instructions which, when executed by one or more processors, cause the one or more processors to perform the steps of:

receiving bandwidth metrics for a destination site from a scheduler determining utilization associated with a destination site based upon the received bandwidth metrics;

computing a difference between the determined utilization and a target utilization;

computing a correction value based upon the difference between the determined utilization and the target utilization, the correction value being associated with the destination site;

outputting a control value based upon a reference control value and the correction value;

allocating bandwidth based upon the control value; and storing the control value, wherein the control value is indexed by a control sequence number.

31. A computer-readable medium carrying one or more sequences of one or more instructions for controlling bandwidth allocations, the one or more sequences of one or more instructions including instructions which, when executed by one or more processors, cause the one or more processors to perform the steps of:

receiving bandwidth metrics for a destination site from a scheduler;

determining utilization associated with a destination site based upon the received bandwidth metrics;

computing a difference between the determined utilization and a target utilization;

computing a correction value based upon the difference between the determined utilization and the target utilization, the correction value being associated with the destination site;

outputting a control value based upon a reference control value and the correction value, wherein the reference control value is stored in a control storage the reference control value having an index based upon a round-trip control time (RTCT), the RTCT being a time between sending of the control value and a subsequent control value; and allocating bandwidth based upon the control value.

32. The computer readable medium according to claim 31, wherein the RTCT includes propagation delay, message transmit/receive delays, and message processing delay.

33. The computer readable medium according to claim 31, further comprising computer-executable instructions for causing the computer system to perform the steps of:

sending the control value on a predetermined interval, the index being based upon a ratio of the RTCT and the predetermined interval.

34. The computer readable medium according to claim 31, further comprising computer-executable instructions for causing the computer system to perform the steps of:

sending the control value to a traffic control processing logic that is located remotely from the scheduler.

35. A computer-readable medium carrying one or more sequences of one or more instructions for controlling bandwidth allocations, the one or more sequences of one or more instructions including instructions which, when executed by one or more processors, cause the one or more processors to perform the steps of:

receiving bandwidth metrics for a destination site from a scheduler;

determining utilization associated with a destination site based upon the received bandwidth metrics;

computing a difference between the determined utilization and a target utilization;

computing a correction value based upon the difference between the determined utilization and the target utilization, and based upon a split gain that specifies at least one of a first gain and a second gain based upon the computed difference, the correction value being associated with the destination site;

outputting a control value based upon a reference control value and the correction value; and allocating bandwidth based upon the control value.

36. A computer-readable medium carrying one or more sequences of one or more instructions for controlling bandwidth allocations, the one or more sequences of one or more instructions including instructions which, when executed by one or more processors, cause the one or more processors to perform the steps of:

receiving bandwidth metrics for a destination site from a scheduler;

determining utilization associated with a destination site based upon the received bandwidth metrics;

computing a difference between the determined utilization and a target utilization;

computing a correction value based upon the difference between the determined utilization and the target utilization, and based upon a unity gain, the correction value being associated with the destination site;

outputting a control value based upon a reference control value and the correction value; and allocating bandwidth based upon the control value.

* * * * *